(12) United States Patent
Singh et al.

(10) Patent No.: US 11,808,193 B2
(45) Date of Patent: Nov. 7, 2023

(54) PREVENTATIVE CONTROLS LOGIC FOR COOLANT CONTROL VALVE (CCV) STUCK OPEN

(71) Applicant: International Engine Intellectual Property Company, LLC, Lisle, IL (US)

(72) Inventors: Navtej Singh, Arlington Heights, IL (US); Paul Boon Charintranond, Palatine, IL (US); Madelyn Rae Hutton, Lisle, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 17/692,072

(22) Filed: Mar. 10, 2022

(65) Prior Publication Data

US 2023/0287823 A1    Sep. 14, 2023

(51) Int. Cl.
*F01N 3/00* (2006.01)
*F01N 3/20* (2006.01)
*F01N 11/00* (2006.01)

(52) U.S. Cl.
CPC .............. *F01N 3/208* (2013.01); *F01N 11/00* (2013.01); *F01N 2240/02* (2013.01); *F01N 2550/05* (2013.01); *F01N 2610/02* (2013.01); *F01N 2610/105* (2013.01); *F01N 2610/1486* (2013.01); *F01N 2900/12* (2013.01); *F01N 2900/1811* (2013.01)

(58) Field of Classification Search
CPC ...... F01N 3/208; F01N 11/00; F01N 2240/02; F01N 2550/05; F01N 2610/02; F01N 2610/105; F01N 2610/1486; F01N 2900/12; F01N 2900/1811

See application file for complete search history.

(56) References Cited

U.S. PATENT DOCUMENTS

| 7,536,853 B2 | 5/2009 | Cook et al. | |
|---|---|---|---|
| 7,966,811 B2 * | 6/2011 | Reed | F01N 3/2066 60/303 |
| 8,122,710 B2 | 2/2012 | Schmale et al. | |
| 10,145,340 B1 * | 12/2018 | Dudar | F02D 41/0002 |

(Continued)

FOREIGN PATENT DOCUMENTS

CN    105298606 A  *  2/2016

*Primary Examiner* — Matthew T Largi
(74) *Attorney, Agent, or Firm* — Mark C. Bach; Umang Khanna

(57) ABSTRACT

A Diesel Emissions Fluid (DEF) Thawing arrangement and method is provided for use with a vehicle having an engine, an Engine Control Module (ECM), an exhaust system, and a Selective Catalyst Reduction (SCR) catalytic device. A DEF injection system is connected to the exhaust system and to the ECM. A DEF tank is connected to the DEF injection system, and is provided with a Urea Quality Sensor (UQS). A coolant loop is connected to the engine and has a Coolant Control Valve (CCV) connected to a control module, and a coolant to DEF heat exchanger. A DEF temperature sensor and an ambient temperature sensor are connected to the control module. The control module is configured to trigger a CCV stuck open fault when the DEF tank temperature exceeds the ambient temperature by a threshold amount for a period of time.

8 Claims, 40 Drawing Sheets

(56) References Cited

U.S. PATENT DOCUMENTS

| | | | |
|---|---|---|---|
| 10,337,391 B2* | 7/2019 | Choi | ............... F01P 7/16 |
| 2007/0289292 A1 | 12/2007 | Cook et al. | |
| 2011/0023461 A1 | 2/2011 | Strots et al. | |
| 2011/0030349 A1 | 2/2011 | Makartchouk et al. | |
| 2016/0076424 A1 | 3/2016 | Taekhoon et al. | |
| 2016/0123204 A1* | 5/2016 | Furesawa | ............... F01N 3/208 60/274 |
| 2018/0319271 A1* | 11/2018 | Barbano | ............... F01N 3/208 |
| 2019/0271247 A1* | 9/2019 | Minezawa | ............... F01N 3/208 |

* cited by examiner

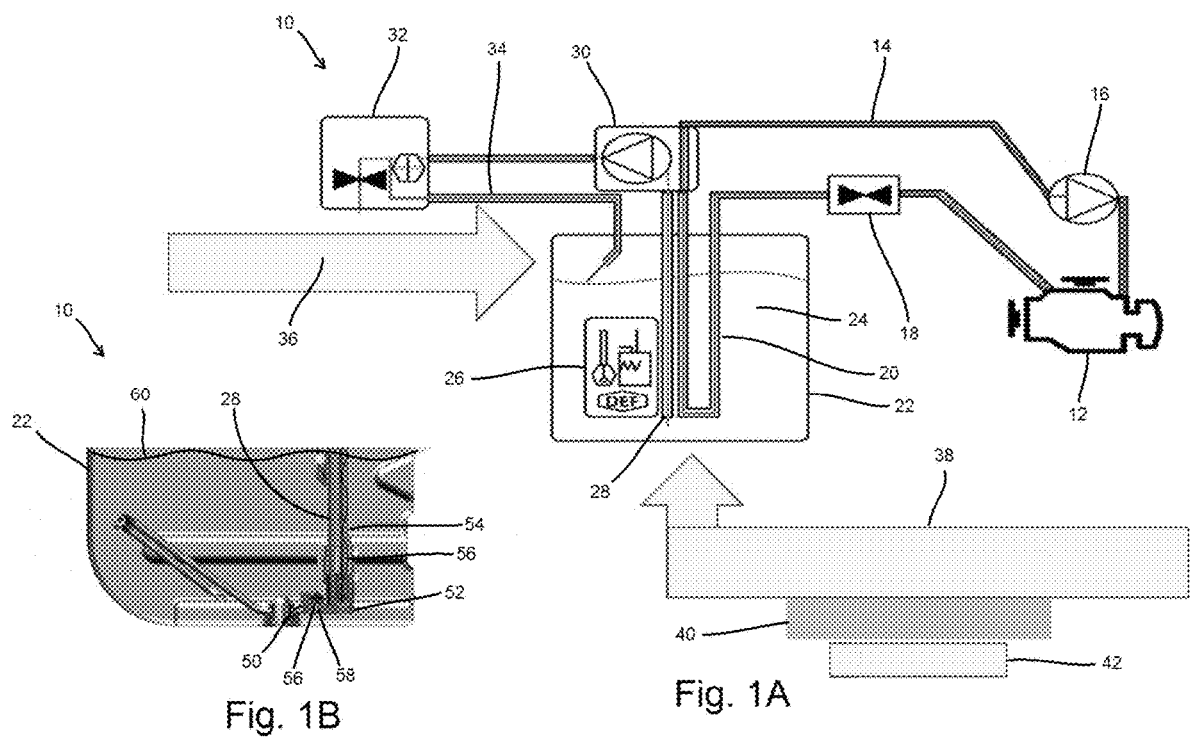

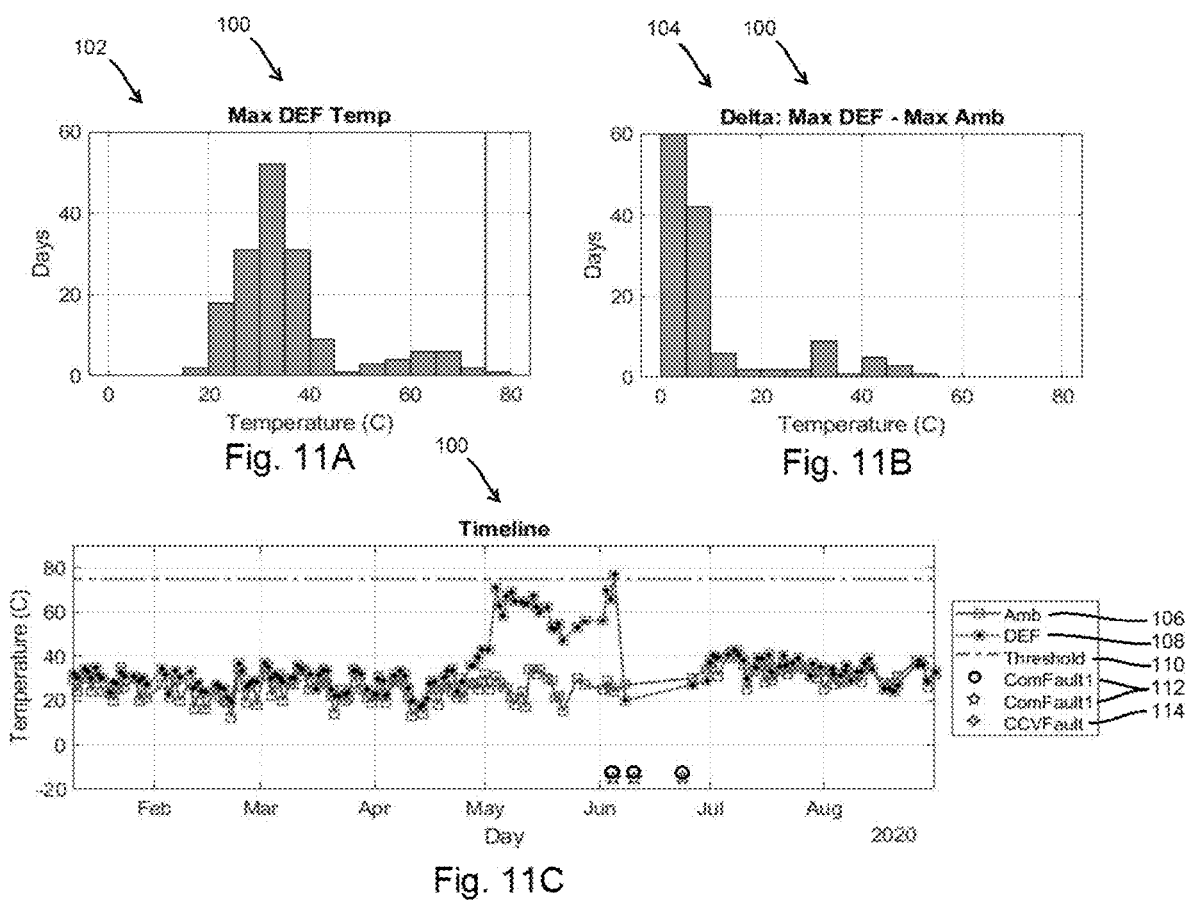

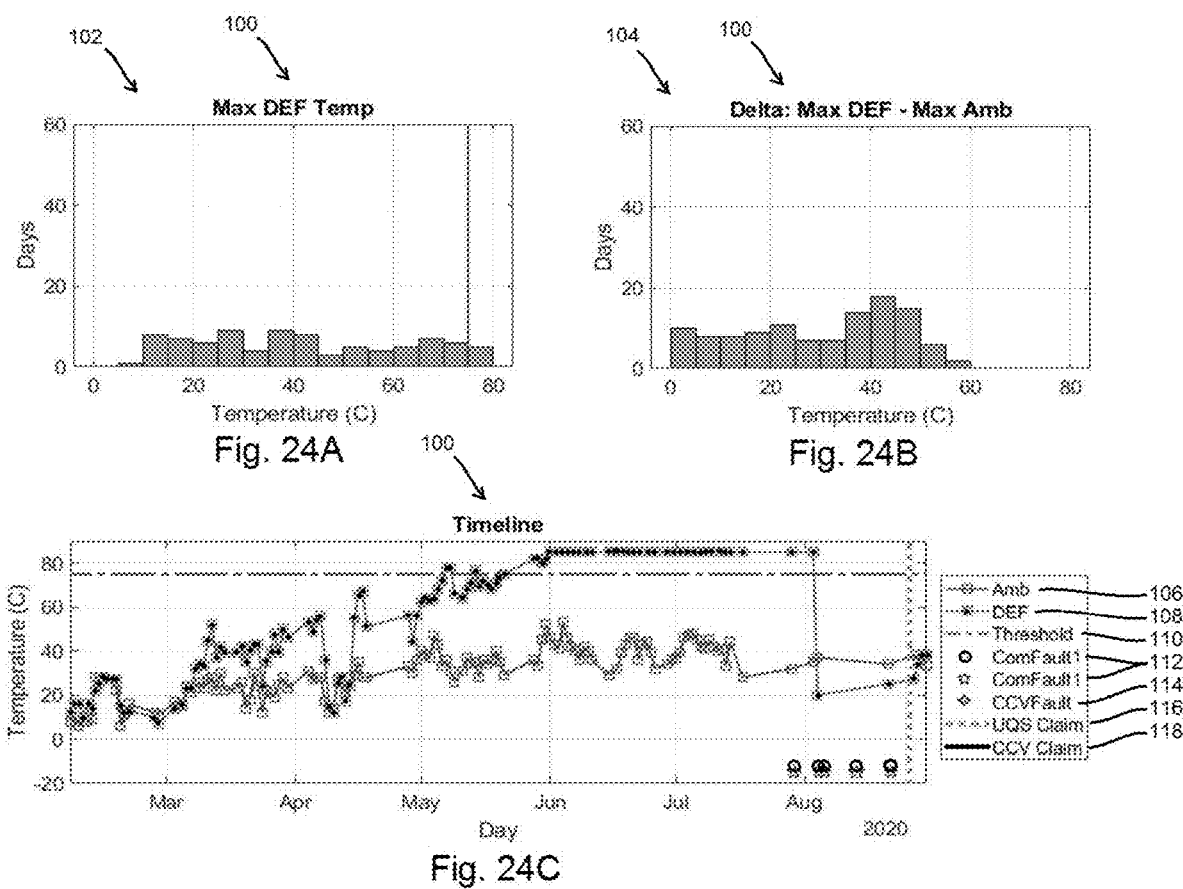

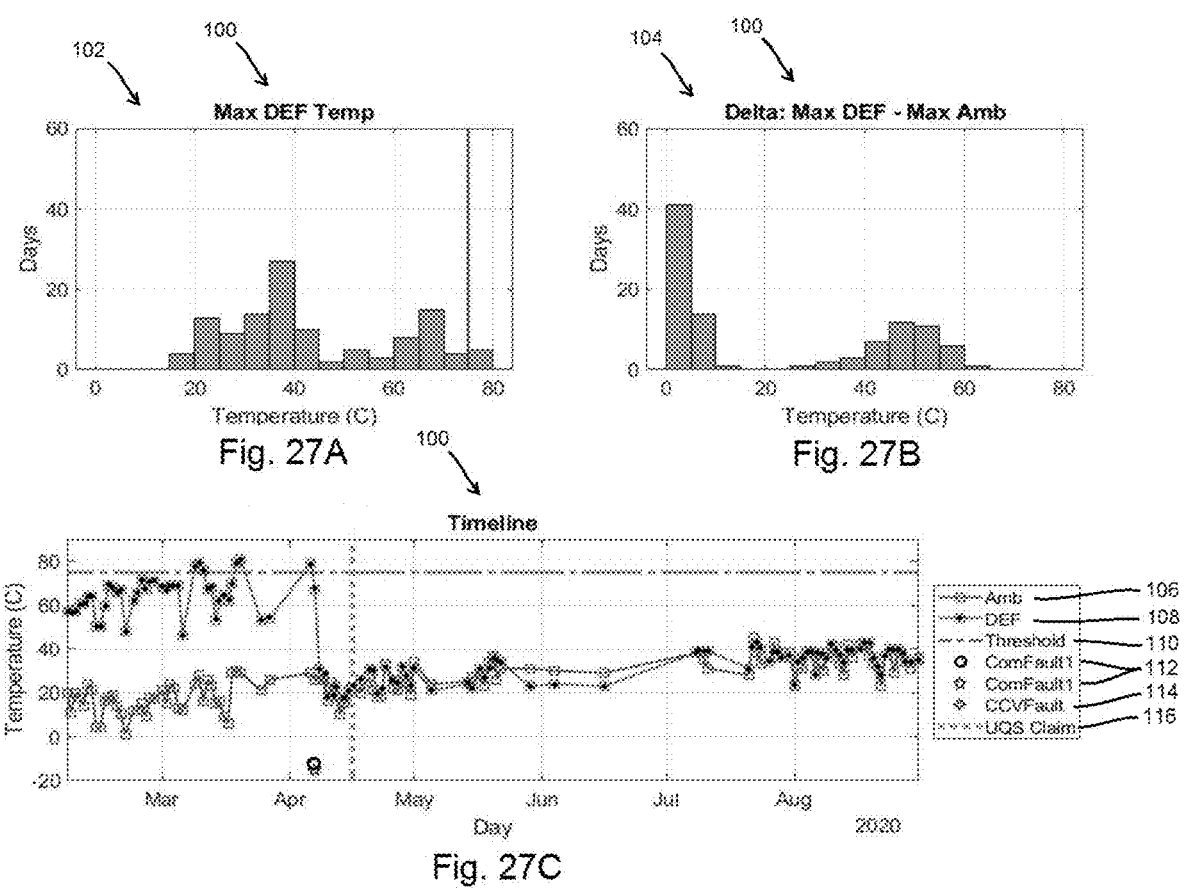

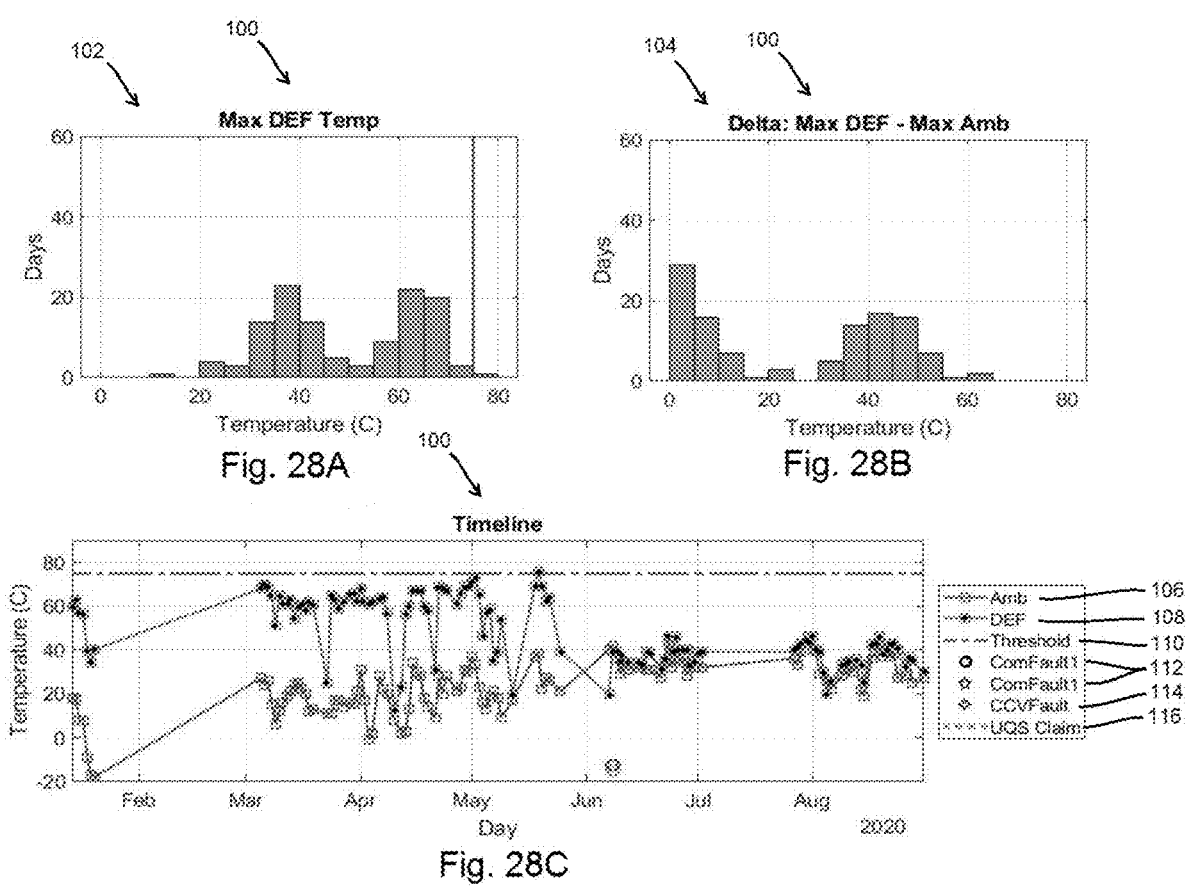

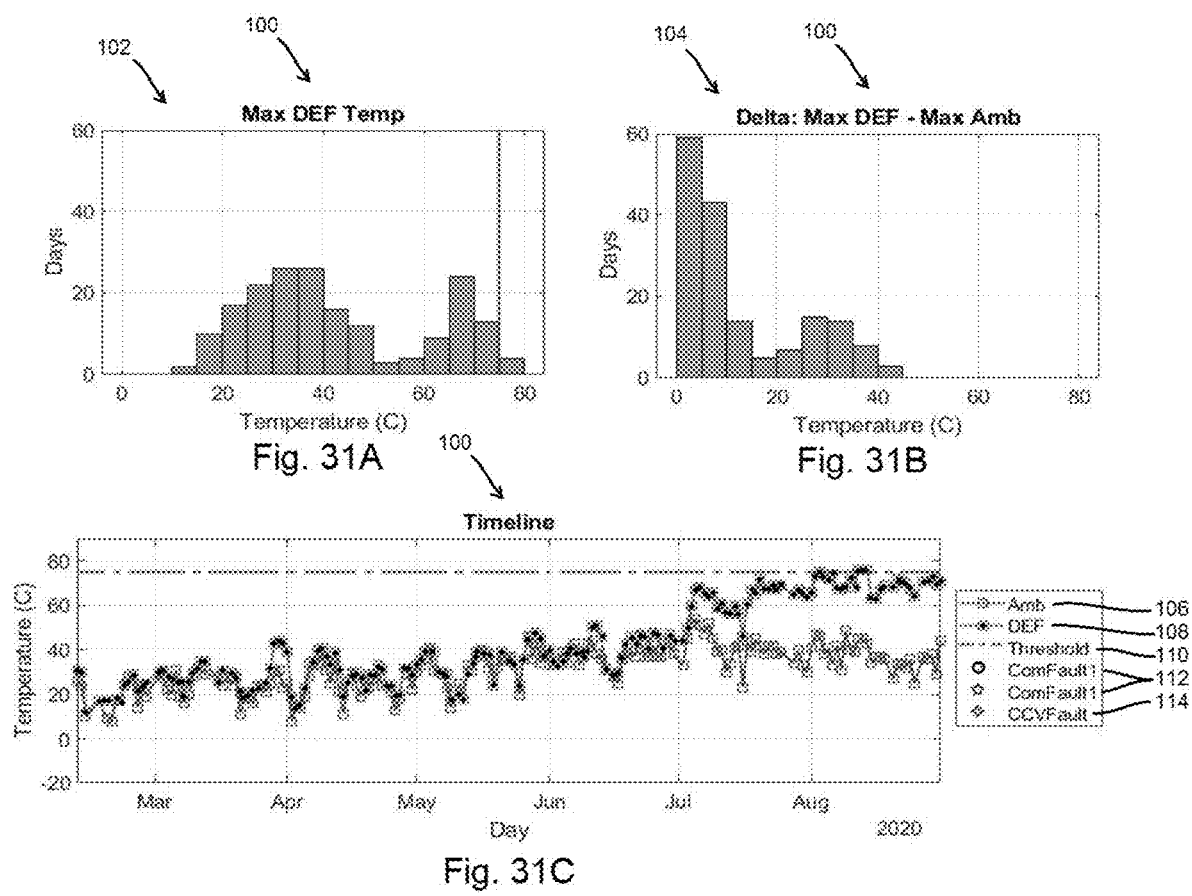

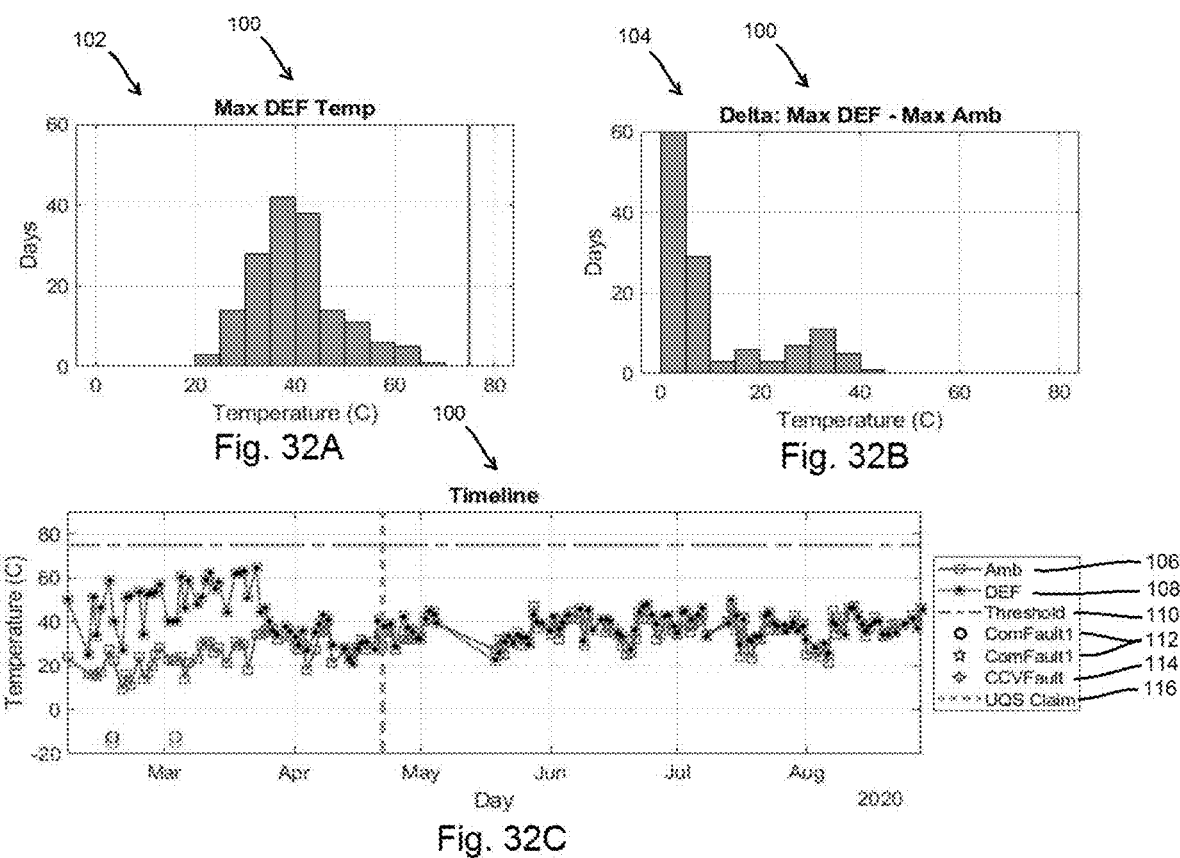

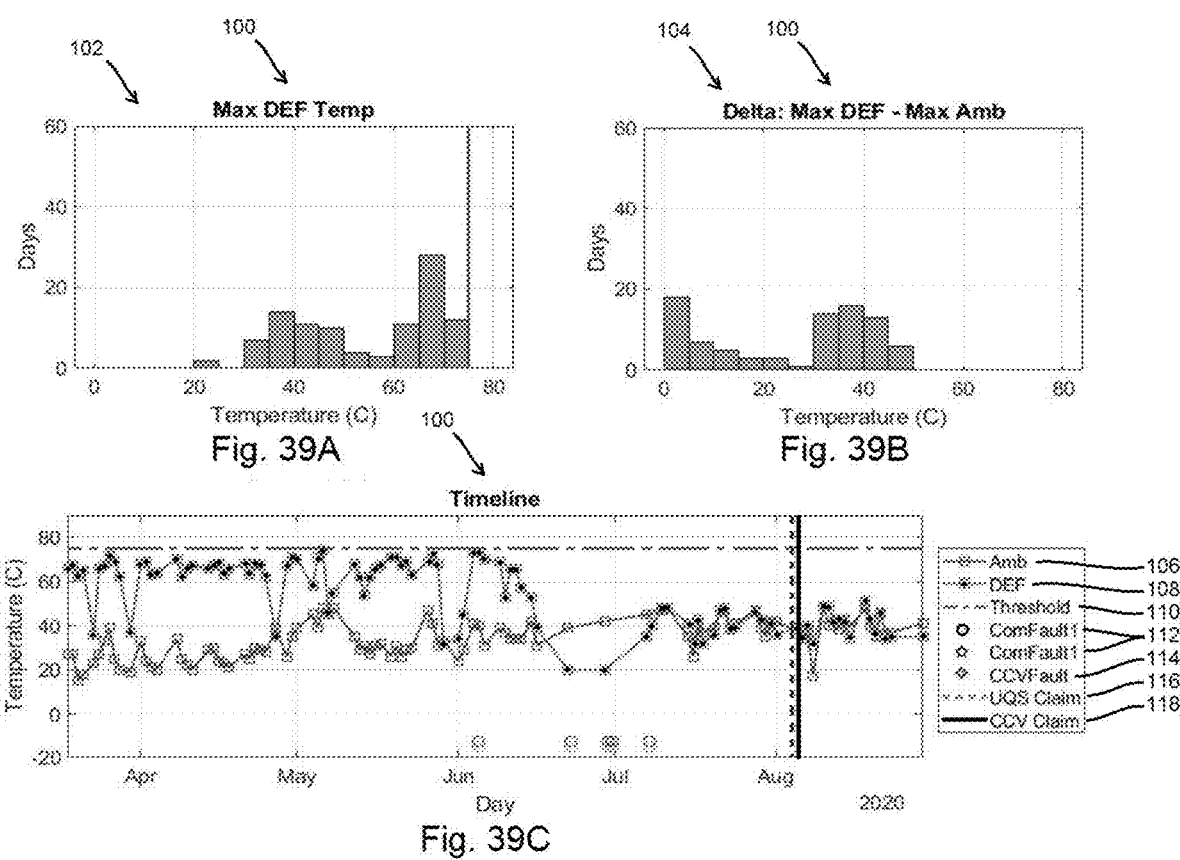

PREVENTATIVE CONTROLS LOGIC FOR COOLANT CONTROL VALVE (CCV) STUCK OPEN

BACKGROUND

This disclosure relates to an apparatus, and control logic therefor, for thawing Diesel Emissions Fluid (DEF) during cold weather in vehicles having diesel engines and Selective Catalytic Reduction (SCR) emissions control systems, and methods of use thereof. Particularly, this disclosure relates to an arrangement and method for quickly and efficiently thawing DEF in a controlled manner in diesel powered vehicles, while protecting a Urea Quality Sensor (UQS) in the DEF tank, as well as the DEF itself, from elevated temperatures that may result from a stuck open Coolant Control Valve (CCV).

RELATED ART

Diesel engines commonly operate with a lean air to fuel ratio, so that only part of the available oxygen is used in the fuel combustion reaction. While this helps to make diesel engines efficient, it also results in the formation of nitrogen oxides (NOx), an undesirable pollutant, during the combustion process. Presently, the Environmental Protection Agency (EPA) regulates the amount of NOx that may be emitted in vehicle exhaust, so that vehicle and engine manufacturers employ various techniques to reduce NOx emissions.

A common technique to reduce NOx tailpipe emissions involves the use of Selective Catalytic Reduction (SCR). SCR works by injecting a solution of urea, a reductant that is sometimes referred to as Diesel Exhaust Fluid (DEF), into the flow of vehicle engine exhaust, often referred to as "dosing." Such DEF is commonly sold under the trademark AdBlue, or as ISO 22241 AUS325. The urea solution then evaporates and thermally decomposes due to the heat of the exhaust. Ammonia liberated from the urea then reacts with the NOx in the presence of a catalyst to form diatomic nitrogen ($N_2$), water ($H_2O$), and carbon dioxide ($CO_2$). The catalyst is provided in the form of a structure, often a honeycomb shape or similar arrangement, with a coating such as a metal oxide or metal exchanged zeolites, located downstream in the exhaust flow from the location of urea injection. In order to maximize the effectiveness of the catalytic device, the evaporated urea and its thermal decomposition products, including the ammonia, must be properly mixed with the vehicle engine exhaust before entering the catalytic device. The SCR urea injector and catalytic device, together with a filter for removing particulates from the exhaust flow, generally located upstream in the exhaust flow from the SCR urea injector and catalytic device, are often collectively referred to as exhaust aftertreatment. DEF injection components are normally controlled by an external control module that may be an Engine Control Unit (ECU) or Diesel Control Unit (DCU), which control the quantity and timing of the DEF injection according to one or more algorithms.

Another technique to reduce NOx tailpipe emissions involves the use of Exhaust Gas Recirculation (EGR). EGR recirculates a percentage of exhaust gases back into the intake of the engine, in order to lower the amount of free oxygen in the intake air and to reduce the peak in-cylinder combustion temperatures. This, in turn, reduces the amount of NOx formation that takes place within the cylinders, while also reducing overall engine efficiency. Most modern diesel engines utilize both EGR and SCR, sometimes in combination with some form of combustion optimization.

DEF itself is an aqueous urea solution that may be made, for non-limiting example, with 32.5% urea and 67.5% deionized water. As such, the freezing point of DEF is −11° C. (12° F.). For the SCR system to function at low temperatures, therefore, a sufficient amount of the frozen DEF in the DEF tank must be melted in as short time as possible, preferably within minutes of starting the vehicle. For example, 2010 EPA emissions requirements require full DEF flow within 70 minutes. Typically, the frozen DEF is melted by heat from the engine, often by way of engine coolant passing through a heat exchanger in the DEF tank.[1] The flow of coolant through the heat exchanger in the DEF tank must be regulated so that the DEF does not exceed 50-60° C. (122-140° F.), as DEF begins to decompose at around 60° C. (140° F.).[2]

[1] Diesel Exhaust Fluid. 17 Nov. 2021. Retrieved 17 Nov. 2021. http://en.wikipedia.org/wiki/Diesel_exhaust_fluid
[2] Id.

Regulation of the flow of coolant through the heat exchanger in the DEF tank is accomplished by a Coolant Control Valve (CCV). The CCV may be controlled by the ECU, DCU, or another controller, in such a way as to quickly and efficiently melt the DEF in the DEF tank without allowing the temperature of the DEF to exceed 50-60° C. (122-140° F.). However, CCV's, like all electromechanical valves, are known to occasionally become stuck in an open, partially open, or closed position. If the CCV becomes stuck in an open or partially open position, the DEF in the DEF tank may exceed its decomposition temperature. Furthermore, certain components of the SCR emission control system may be damaged, such as the DEF injector, DEF pump, and certain sensors.

In particular, the SCR emission control system may be provided with a Urea Quality Sensor (UQS), which may provide the ECU, DCU, or other controller with information about the quality of the urea that makes up the DEF, the presence of any contaminants in the DEF, as well as information about the temperature of the DEF in the DEF tank, and/or the level of DEF in the DEF tank. For example, the UQS may employ the method of detecting the thermal coefficient of the DEF, which correlates to the concentration of urea in the DEF. Alternately, the UQS may employ optical, electrical, or other principles to determine the quality of the urea that makes of the DEF.

It is known that the UQS may be susceptible to accelerated aging and/or failure resulting from elevated DEF temperatures in the DEF tank. Furthermore, accelerated aging and/or failure of the UQS may result from elevated DEF temperatures that are not sufficiently high to otherwise trigger a CCV stuck open fault based simply on the temperature of the DEF alone. For example, it is known to trigger a CCV stuck open fault when the DEF tank temperature, according to the UQS signal, remains above the single temperature threshold of 75° C. for a certain amount of time. However, DEF tanks having a stuck open, or stuck partially open, CCV often do not actually reach the 75° C. threshold to trigger the CCV stuck open fault. As a result, the UQS is subject to accelerated aging and/or ultimately failure due to the elevated DEF temperatures not exceeding the 75° C. threshold. Eventually, UQS failure is indicated by a lack of communication from the sensor.

Accordingly, there is an unmet need for an arrangement and method for quickly and efficiently thawing DEF in a controlled manner in diesel powered vehicles, while protecting the UQS in the DEF tank, as well as the DEF itself, from elevated temperatures that may result from a stuck open or stuck partially open CCV under conditions wherein the DEF in the DEF tank does not actually reach the 75° C. threshold to trigger a CCV stuck open fault.

SUMMARY

According to one embodiment of the preventative controls logic for CCV valve stuck open, a vehicle has a DEF Thawing Apparatus. The vehicle has an engine, and an engine control module connected to the engine and configured to control the engine. An exhaust system is connected to the engine, and an SCR catalytic device is connected to the exhaust system. A DEF injection system is connected to the exhaust system upstream of the SCR catalytic device, and further connected to the engine control module. A DEF tank is connected to the DEF injection system. A coolant loop is connected to the engine. The coolant loop has at least one CCV connected to a control module, and a coolant to DEF heat exchanger. A DEF temperature sensor is in communication with the DEF tank and is connected to the control module to which the CCV is connected. An ambient temperature sensor is connected to the control module to which the CCV and DEF temperature sensor are connected. The control module to which the CCV, the DEF temperature sensor, and the ambient temperature sensor are connected is configured to trigger a CCV stuck open fault when the DEF tank temperature exceeds the ambient temperature by a first threshold amount for a first period of time. A UQS is arranged in fluid communication with the DEF tank and is connected to a control module.

According to another embodiment of the preventative controls logic for CCV valve stuck open, a DEF Thawing Apparatus is provided for a vehicle having an engine, an ECM connected to the engine and configured to control the engine, and an exhaust system connected to the engine and having an SCR catalytic device. A DEF injection system is connected to the exhaust system upstream of the SCR catalytic device, and further connected to the engine control module. A DEF tank is connected to the DEF injection system. A coolant loop is connected to the engine. The coolant loop has at least one CCV connected to a control module, and a coolant to DEF heat exchanger. A DEF temperature sensor is in communication with the DEF tank and is connected to the control module to which the CCV is connected. An ambient temperature sensor is connected to the control module to which the CCV and DEF temperature sensor are connected. The control module to which the CCV, the DEF temperature sensor, and the ambient temperature sensor are connected is configured to trigger a CCV stuck open fault when the DEF tank temperature exceeds the ambient temperature by a first threshold amount for a first period of time. A UQS is arranged in fluid communication with the DEF tank and is connected to a control module.

According to yet another embodiment of the preventative controls logic for CCV valve stuck open, a method of thawing DEF in a vehicle having an engine, an ECM connected to the engine and configured to control the engine, an exhaust system connected to the engine and having an SCR catalytic device, and a DEF injection system connected to the exhaust system and having a DEF tank, includes several steps. The first step is connecting a coolant loop to the engine, the coolant loop having at least one CCV connected to a control module, and a coolant to DEF heat exchanger. The second step is placing a DEF temperature sensor in communication with the DEF tank and connecting it to the control module to which the CCV is connected. The third step is connecting an ambient temperature sensor to the control module to which the CCV and DEF temperature sensor are connected. The fourth step is configuring the control module to which the CCV, the DEF temperature sensor, and the ambient temperature sensor are connected to trigger a CCV stuck open fault when the DEF tank temperature exceeds the ambient temperature by a first threshold amount for a first period of time. The fifth step is arranging a UQS in fluid communication with the DEF tank and connecting it to a control module.

DESCRIPTION OF THE DRAWINGS

FIGS. 1A, 1B and 1C are graphic representations of apparatuses for thawing DEF during cold weather in vehicles having diesel engines and SCR emission control systems that implement an embodiment of the preventative controls logic for ccv valve stuck open according to the present disclosure, as described herein;

FIGS. 3A, 4A, 5A, 6A, 7A, 8A, 9A, 10A, 11A, 12A, 13A, 14A, 15A, 16A, 17A, 18A, 19A, 20A, 21A, 22A, 23A, 24A, 25A, 26A, 27A, 28A, 29A, 30A, 31A, 32A, 33A, 34A, 35A, 36A, 37A, 38A, and 39A are graphs of the maximum DEF temperature versus the number of days such maximum DEF temperature was achieved, of each of a population of vehicles having diesel engines and SCR emission control systems utilizing DEF and UQS, which may benefit from an embodiment of the preventative controls logic for CCV valve stuck open according to the present disclosure, as described herein;

FIGS. 3B, 4B, 5B, 6B, 7B, 8B, 9B, 10B, 11B, 12B, 13B, 14B, 15B, 16B, 17B, 18B, 19B, 20B, 21B, 22B, 23B, 24B, 25B, 26B, 27B, 28B, 29B, 30B, 31B, 32B, 33B, 34B, 35B, 36B, 37B, 38B, and 39B are graphs of the maximum DEF temperature minus the maximum ambient temperature versus the number of days such maximum DEF temperature minus maximum ambient temperature was achieved, of each of a population of vehicles having diesel engines and SCR emission control systems utilizing DEF and UQS, which may benefit from an embodiment of the preventative controls logic for CCV valve stuck open according to the present disclosure, as described herein; and FIGS. 3C, 4C, 5C, 6C, 7C, 8C, 9C, 10C, 11C, 12C, 13C, 14C, 15C, 16C, 17C, 18C, 19C, 20C, 21C, 22C, 23C, 24C, 25C, 26C, 27C, 28C, 29C, 30C, 31C, 32C, 33C, 34C, 35C, 36C, 37C, 38C, and 39C are graphs of ambient temperature, DEF temperature, the 75° C. threshold to trigger a CCV stuck open fault, the occurrence of COM faults, and the occurrence of a UQS claim, of each of a population of vehicles having diesel engines and SCR emission control systems utilizing DEF and UQS, which may benefit from an embodiment of the preventative controls logic for CCV valve stuck open according to the present disclosure, as described herein.

DETAILED DESCRIPTION

Figure 1C:
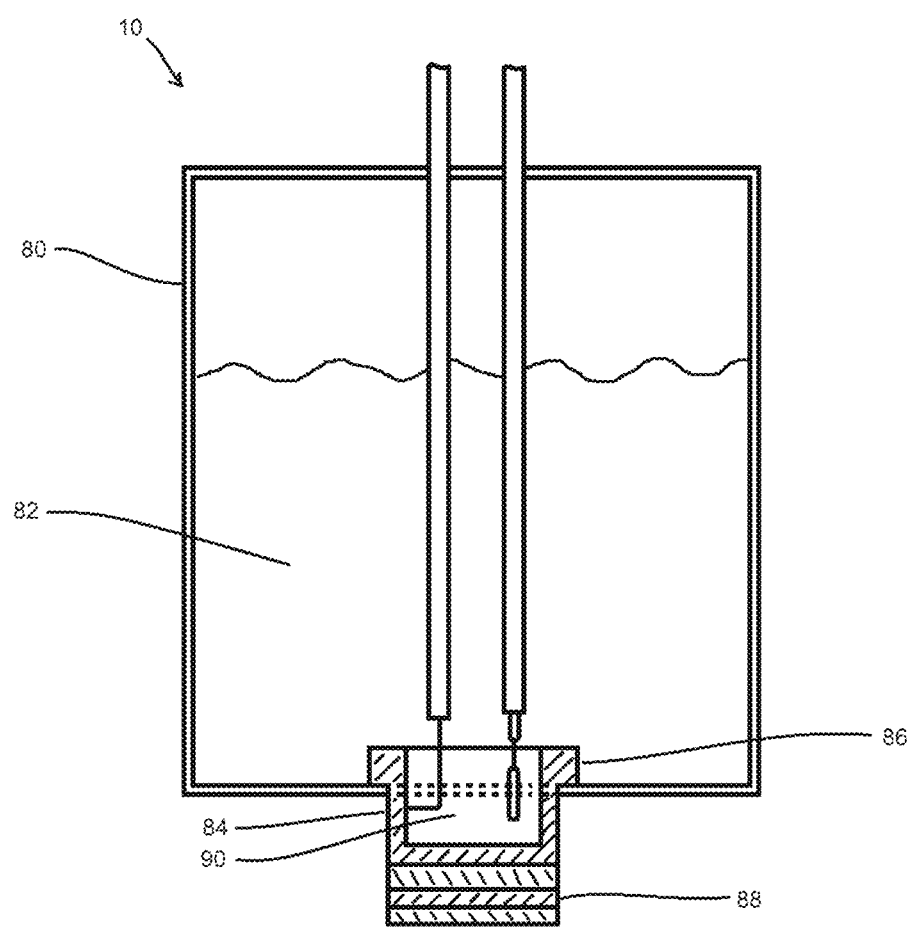

Embodiments described herein relate to an apparatus, and control logic therefor, for thawing Diesel Emissions Fluid (DEF) during cold weather in vehicles having diesel engines and Selective Catalytic Reduction (SCR) emissions control systems, and methods of use thereof. Specifically, embodiments described herein relate to an arrangement and method for thawing DEF in a controlled manner in diesel powered vehicles, while protecting the Urea Quality Sensor (UQS) in the DEF tank, as well as the DEF itself, from elevated temperatures that may result from a stuck open or stuck partially open Coolant Control Valve (CCV) under conditions wherein the DEF in the DEF tank does not actually reach a given threshold to trigger a CCV stuck open fault. Embodiments of the apparatus and control logic, and methods of use thereof, may be applied for non-limiting example to various types of passenger vehicles, recreational vehicles, and commercial vehicles, such as highway or semi-tractors with and without auxiliary power units (APUs), straight trucks with and without APUs, buses, fire trucks, agricultural vehicles, construction vehicles, campers, motorhomes, motorcycles, scooters, rail travelling vehicles, and trailers with APUs or refrigeration units. It is further contemplated that embodiments of the arrangement and method may be applied to vehicles having hybrid electric drive. It is further contemplated that, while presented herein as being used with diesel engines, embodiments of the arrangement and method may be applied to vehicles having engines configured for various fuels, such as, for non-limiting example, gasoline, diesel, propane, natural gas, and hydrogen, and particularly with respect to such engines being configured for lean-burn that use SCR, DEF, and UQS.

According to an embodiment of the apparatus, and control logic therefor, for thawing DEF during cold weather in vehicles having diesel engines and SCR emissions control systems, and methods of use thereof, a vehicle having a diesel engine and an SCR emission control system is provided with DEF tank, a DEF pump, and a DEF injector. The diesel engine, DEF pump, and DEF injector may be controlled by an Engine Control Unit (ECU) or Diesel Control Unit (DCU), or by an ECU or DCU in combination with one or more other controllers. The ECU, the DCU, and/or the one or more other controllers may control the quantity and timing of the DEF injection according to one or more algorithms. The DEF tank is provided with an engine coolant to DEF heat exchanger, which is supplied with heated coolant from the engine cooling system by way of a coolant loop having at least one CCV. The CCV, which regulates flow of engine coolant through the coolant loop, may be controlled by the ECU, the DCU, and/or the one or more other controllers.

The SCR emission control system is provided with a UQS, which provides the ECU, DCU, and/or other controller(s) with information about the quality of the urea that makes up the DEF, and/or the presence of any contaminants in the DEF, and/or the temperature of the DEF in the DEF tank, and/or the level of DEF in the DEF tank. The ECU, DCU, and/or other controller(s) may or may not be configured to trigger a CCV stuck open fault when the DEF tank temperature, according to the UQS signal or according to a signal from another temperature sensing device, remains above a single temperature threshold, for non-limiting example of 75° C., for a certain amount of time. Moreover, preventative logic within the ECU, DCU, and/or other controller(s) monitors for any divergence between the ambient temperature, as provided by at least one ambient temperature sensor, and the temperature of the DEF tank. If a divergence between the ambient temperature and the temperature of the DEF tank is detected that exceeds a set threshold amount, then the ECU, DCU, and/or other controller(s) triggers a CCV stuck open or stuck partially open fault.

The amount of time that a divergence between the ambient temperature and the temperature of the DEF tank must be detected in order to cause the ECU, DCU, and/or other controller(s) to trigger the CCV stuck open or stuck partially open fault may be fixed, or may be calibratable. Similarly, the threshold amount by which the ambient temperature and the temperature of the DEF tank must diverge in order to cause the ECU, DCU, and/or other controller(s) to trigger a CCV stuck open or stuck partially open fault may be fixed, or may be calibratable. Furthermore, the amount of time that a divergence between the ambient temperature and the temperature of the DEF tank is detected in order to trigger the CCV stuck open or stuck partially open fault, and/or the threshold amount by which the ambient temperature and the temperature of the DEF tank must diverge in order to cause the ECU, DCU, and/or other controller(s) to trigger a CCV stuck open or stuck partially open fault, may themselves be functions of the ambient temperature and/or the temperature of the DEF.

For non-limiting example, at a higher ambient temperature, the amount of time that a divergence between the ambient temperature and the temperature of the DEF tank must be detected in order to trigger the CCV stuck open or stuck partially open fault may be less than at a lower ambient temperature. Similarly, for non-limiting example, at a higher ambient temperature, the threshold amount by which the ambient temperature and the temperature of the DEF tank must diverge in order to cause the ECU, DCU, and/or other controller(s) to trigger a CCV stuck open or stuck partially open fault may be less than at a lower ambient temperature. Additional conditions may be applied by the ECU, DCU, and/or other controller(s) in determining whether to trigger a CCV stuck open or stuck partially open fault. For non-limiting example, such additional conditions may include requiring that the vehicle be moving above a threshold velocity for a threshold amount of time, and/or the ambient temperature being above a threshold temperature, for non-limiting example the freezing temperature of water. These additional conditions may be applied in order to mitigate the occurrence of false CCV stuck open or stuck partially open faults resulting from vehicle heat sources within and around the DEF tank.

The present apparatus, and control logic therefor, for thawing DEF during cold weather in vehicles having diesel engines and SCR emissions control systems, and methods of use thereof, which is configured to protect the UQS in the DEF tank, as well as the DEF itself, from elevated temperatures that may result from a stuck open or stuck partially open CCV under conditions wherein the DEF in the DEF tank does not actually reach a given threshold to trigger a CCV stuck open fault, arises from data analysis that shows that occurrences of failed UQS correlate with increased divergence between the ambient temperature and the temperature of the DEF tank that results from a stuck open or stuck partially open CCV outside of a frozen/thawing DEF condition. Therefore, the present apparatus, and control logic therefor, for thawing DEF during cold weather in vehicles having diesel engines and SCR emissions control systems, and methods of use thereof, protects the UQS from accelerated aging and failure resulting from elevated temperatures due to a stuck open or stuck partially open CCV allowing engine coolant to flow through the coolant to DEF heat exchanger outside of a frozen/thawing DEF condition.

This extends the life of the UQS, and reduces DEF degradation due to high temperatures.

Turning now to FIG. 1A, an embodiment is shown of the apparatus, and control logic therefor, for thawing DEF during cold weather in vehicles having diesel engines and SCR emissions control systems, and methods of use thereof. The DEF thawing apparatus 10 includes a DEF tank 22 containing DEF 24 for use in the SCR emission control system. A diesel engine 12 is provided with an engine coolant pump 16, which circulates engine coolant through a DEF heating coolant loop 14 having a coolant to DEF heat exchanger 20 located in the DEF tank 22. A CCV 18 controls the amount of engine coolant that is circulated through the DEF heating coolant loop 14, in order to thaw the DEF 24 in a controlled manner, while protecting the UQS 26 in the DEF tank 22, as well as the DEF 24 itself, from elevated temperatures.

A DEF pump 30 draws DEF 24 out of the DEF tank 22 by way of a DEF draw pipe 28, and supplies it under pressure to a DEF injector 32, which injects it into the exhaust flow within the SCR emission control system of the vehicle exhaust system (not shown) under the control of the ECU, DCU, or other controller (not shown). Excess DEF that is not used by the DEF injector 32 is returned to the DEF tank 22 by way of a DEF recirculation line 34. Circulation of excess DEF through the DEF injector 32 and back to the DEF tank 22 also functions to cool the DEF injector 32, so that there is a DEF heat load 36 to the DEF tank 22 from the DEF injector cooling function of the recirculating DEF. Additional heat loads experienced by the DEF 24 in the DEF tank 22 include environmental and vehicle generated radiated heat loads 38 and vehicle heat sources 42, which are exacerbated by system noise 40.

FIG. 1B shows a partial detail view of an embodiment of the apparatus, and control logic therefor, for thawing DEF during cold weather in vehicles having diesel engines and SCR emissions control systems, and methods of use thereof. The DEF thawing apparatus 10 again includes a DEF tank 22 having a DEF draw pipe 28 for drawing DEF out of the DEF tank 22. The DEF tank 22 is provided with an ultrasonic UQS 50, which may be connected to the ECU, DCU, or other controller (not shown), and is used to determine the quality of the DEF and/or the presence of any contaminants. An ultrasonic piezoelectric level sensor 52 is also connected to the ECU, DCU, or other controller, and is used to determine the DEF fluid level 60. The ultrasonic piezoelectric level sensor 52 is further provided with a focus tube 54, wherein the ultrasonic piezoelectric level sensor 52 projects sound waves 56 in order to determine the DEF fluid level 60. The focus tube 54 functions to improve the ultrasonic piezoelectric level sensor's 52 capability to accurately determine the DEF fluid level 60. The ultrasonic piezoelectric level sensor 52 may further be provided with a Printed Circuit Board (PCB) 58 with thermistor for determining the temperature of the DEF.

FIG. 1C shows another embodiment of the apparatus, and control logic therefor, for thawing DEF during cold weather in vehicles having diesel engines and SCR emissions control systems, and methods of use thereof. The DEF thawing apparatus 10 shown in FIG. 1C includes a DEF tank 80 containing DEF 82. An integrated UQS 84 is removably attached to the bottom of the DEF tank 80 by way of an internal flange 86, with the sensor portions 90 of the integrated UQS 84 located within the DEF tank 80 or in fluid communication with the DEF 82 in the DEF tank 80. The integrated UQS 84 may be sealed to the DEF tank 80 by way of HDPE, pipe threads, or other suitable sealing means. In this way, the integrated UQS 84 may be removed if replacement thereof is needed by emptying the DEF tank 80 and removing the integrated UQS 84 from within the DEF tank 80. A PCB 88 is encapsulated or otherwise sealed into the body of the integrated UQS 84, generally outside of the periphery of the DEF tank 80. In this way, the PCB 88 is completely isolated from any moisture from the DEF 82 in the DEF tank 80, in order to avoid communication fault codes arising from moisture infiltration.

With respect to the embodiment of the apparatus, and control logic therefor, for thawing DEF during cold weather in vehicles having diesel engines and SCR emissions control systems, and methods of use thereof, that appears in FIGS. 1A, 1B, and 1C, the diesel engine, DEF pump, DEF injector, and/or CCV may again be controlled by an ECU or DCU, or by an ECU or DCU in combination with one or more other controllers. The ECU, the DCU, and/or the one or more other controllers may control the quantity and timing of the DEF injection, and may regulate the flow of engine coolant through the engine coolant to DEF heat exchanger using the CCV, according to one or more algorithms. The ECU, DCU, and/or other controller(s) may or may not be configured to trigger a CCV stuck open fault when the DEF tank temperature, according to the UQS signal or according to a signal from another temperature sensing device, remains above a single temperature threshold, for non-limiting example of 75° C., for a certain amount of time. Preventative logic within the ECU, DCU, and/or other controller(s) again monitors for any divergence between the ambient temperature, as provided by at least one ambient temperature sensor (not shown), and the temperature of the DEF tank. If a divergence between the ambient temperature and the temperature of the DEF tank is detected that exceeds a set threshold amount, then the ECU, DCU, and/or other controller(s) triggers a CCV stuck open or stuck partially open fault.

Figure 2A:
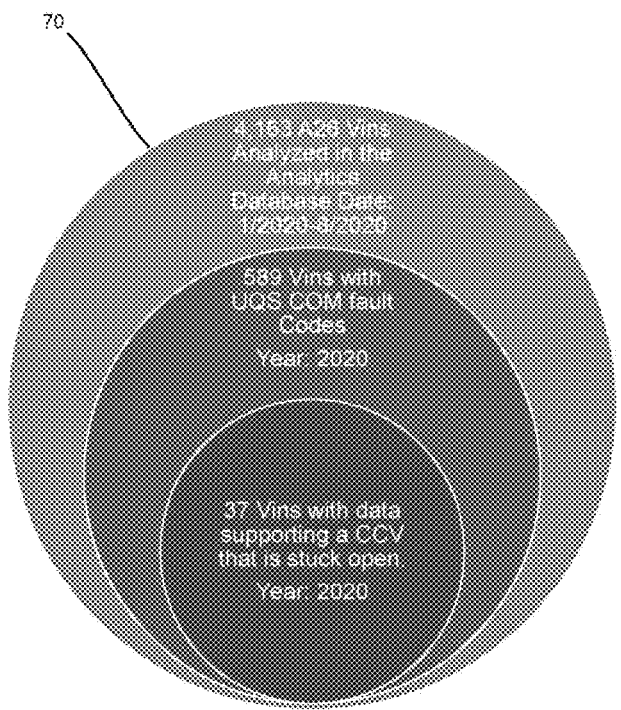
FIG. 2A is a graphic representation in the form of a Venn diagram of a population of vehicles having diesel engines and SCR emission control systems utilizing DEF and UQS that may benefit from an embodiment of the preventative controls logic for ccv valve stuck open according to the present disclosure, as described herein.

Turning now to FIG. 2A, a Venn diagram 70 is shown of vehicles analyzed in determining the unmet need for the present apparatus, and control logic therefor, for thawing DEF during cold weather in vehicles having diesel engines and SCR emissions control systems, and methods of use thereof, while protecting the UQS in the DEF tank, as well as the DEF itself, from elevated temperatures that may result from a stuck open or stuck partially open CCV under conditions wherein the DEF in the DEF tank does not actually reach a given threshold to trigger a CCV stuck open fault. 4163 vehicles were analyzed from January through August of 2020. 589 of these showed UQS COM fault codes, whereas only 37 of these showed data supporting a CCV stuck open fault based on the method of triggering a CCV stuck open fault when the DEF tank temperature remains above a single temperature threshold for a certain amount of time. This shows that improving CCV logic provides an opportunity to reduce the occurrence of extended high DEF and UQS temperatures because of a stuck CCV.

Figure 2B:
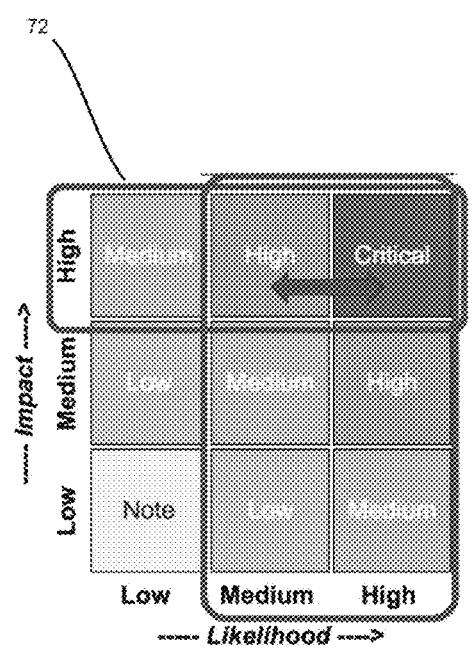
FIG. 2B is a graphic representation in the form of a risk matrix for the condition of a CCV stuck open or partially open, as described herein.
Figure 3A:
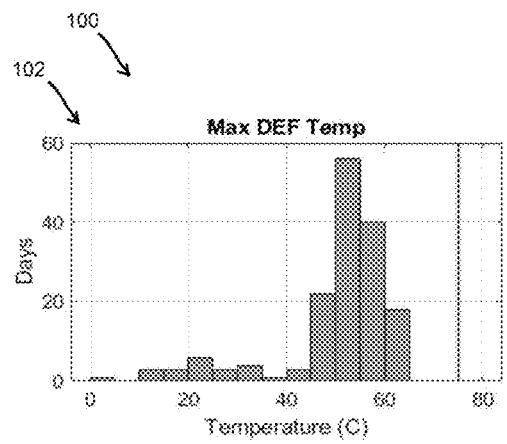
Figure 3B:
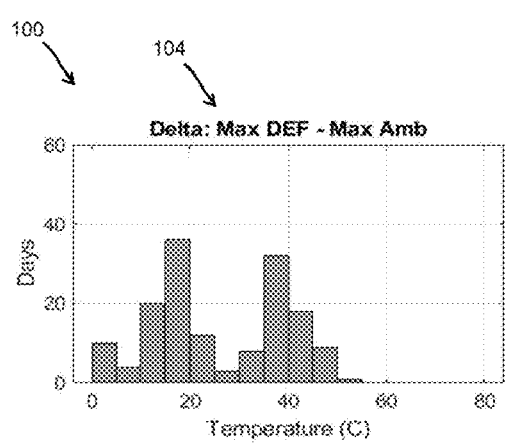
Figure 3C:
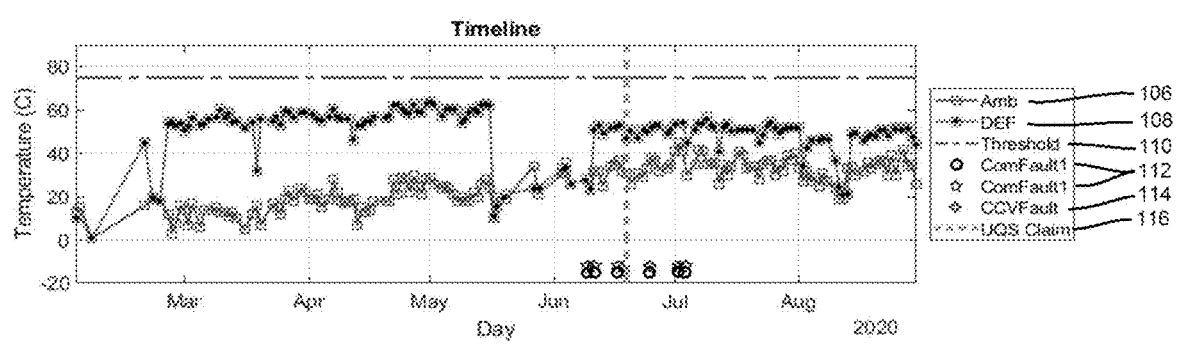
Figure 4A:
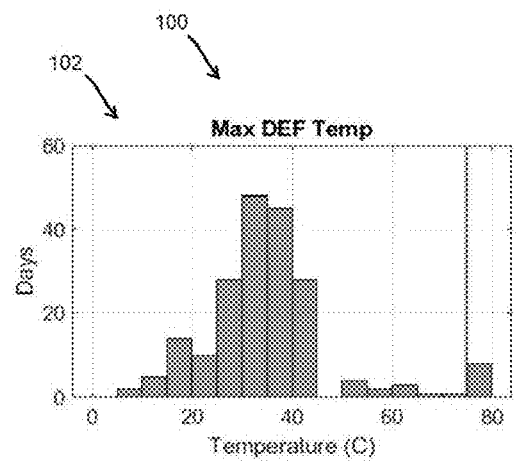
Figure 4B:
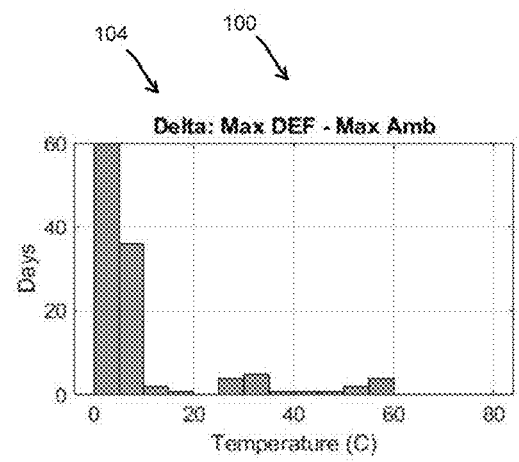
Figure 4C:
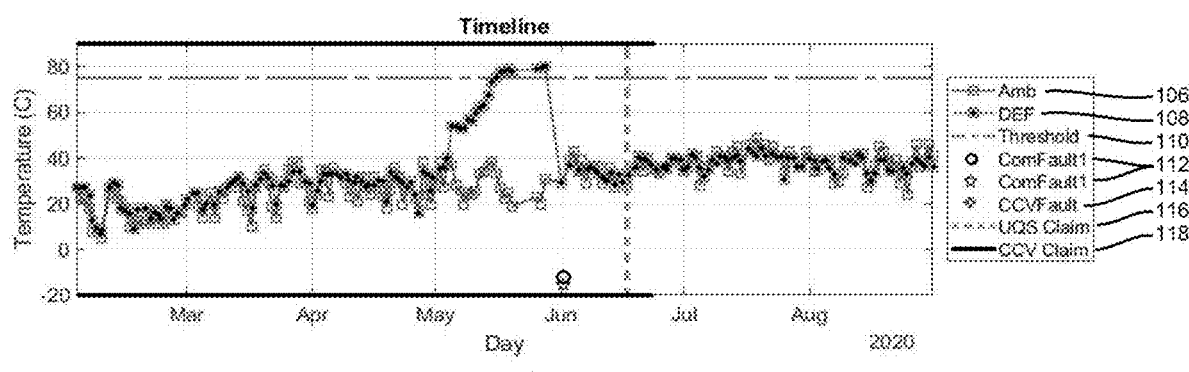
Figure 5A:
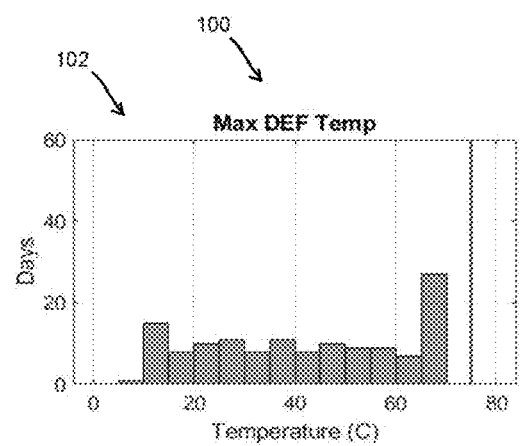
Figure 5B:
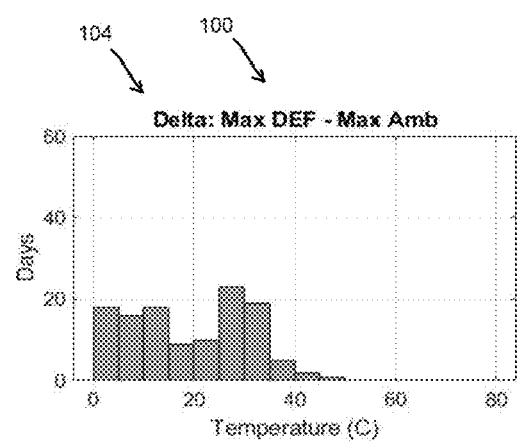
Figure 5C:
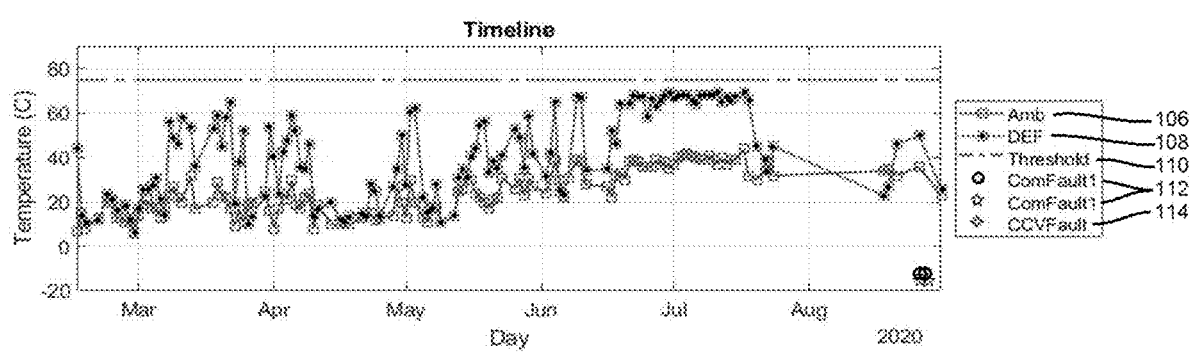
Figure 6A:
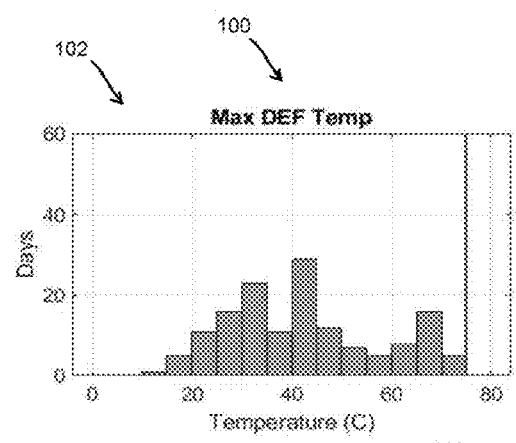
Figure 6B:
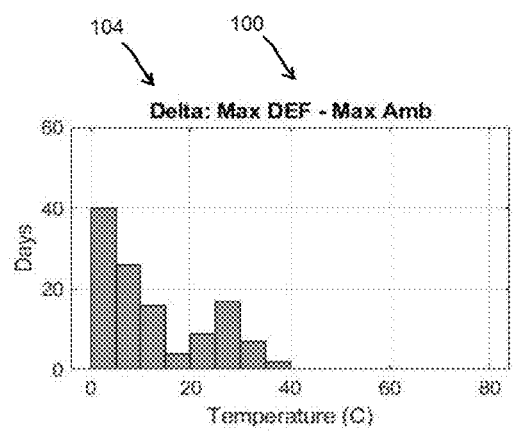
Figure 6C:
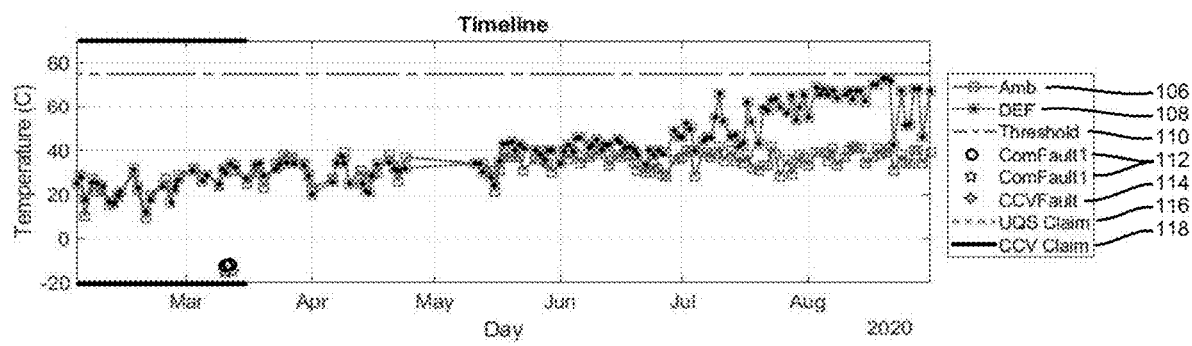
Figure 7A:
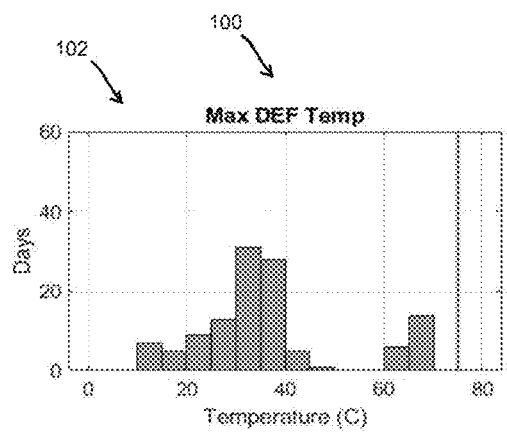
Figure 7B:
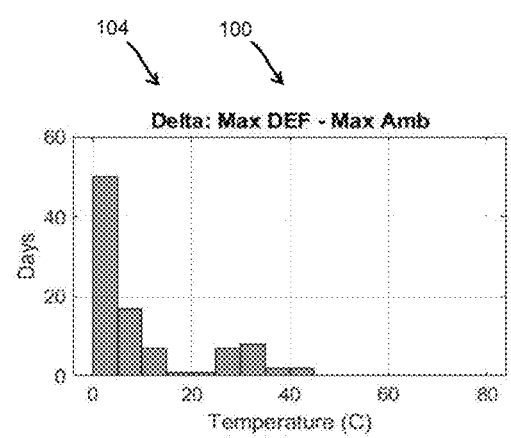
Figure 7C:
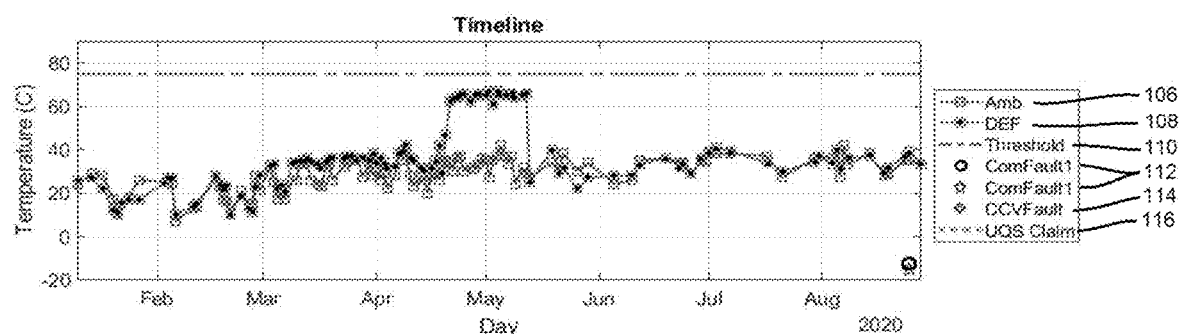
Figure 8A:
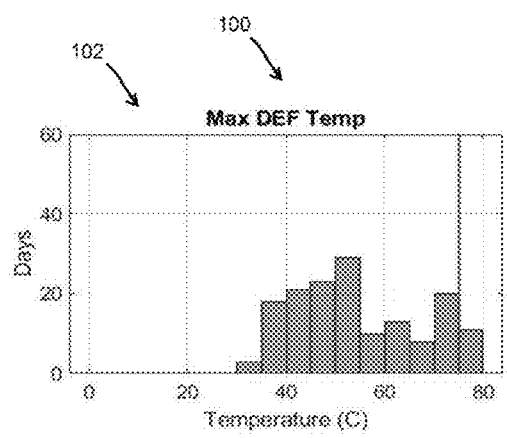
Figure 8B:
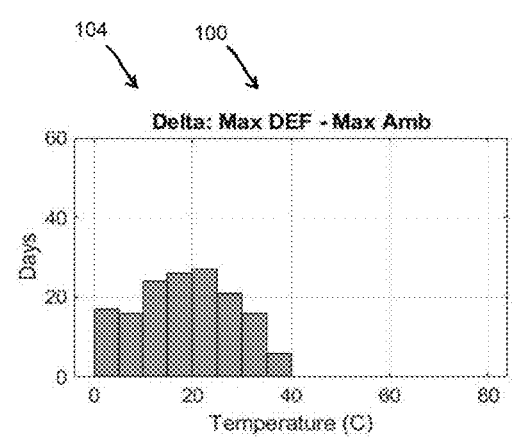
Figure 8C:
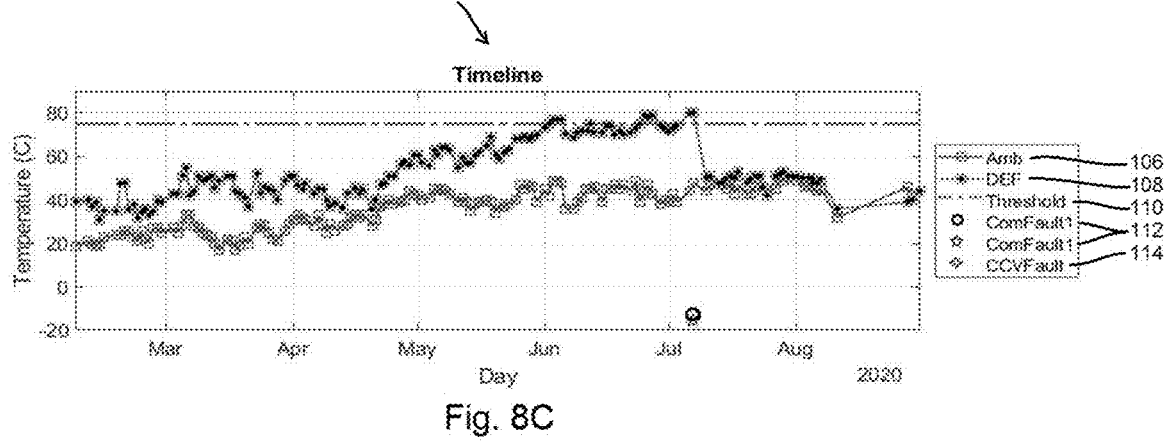
Figure 9A:
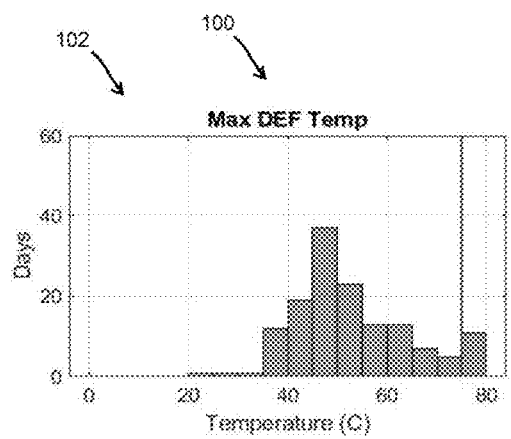
Figure 9B:
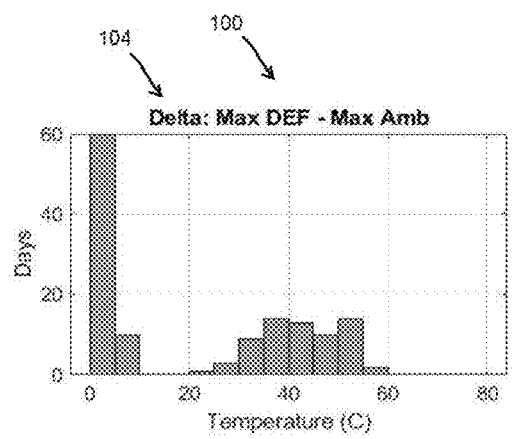
Figure 9C:
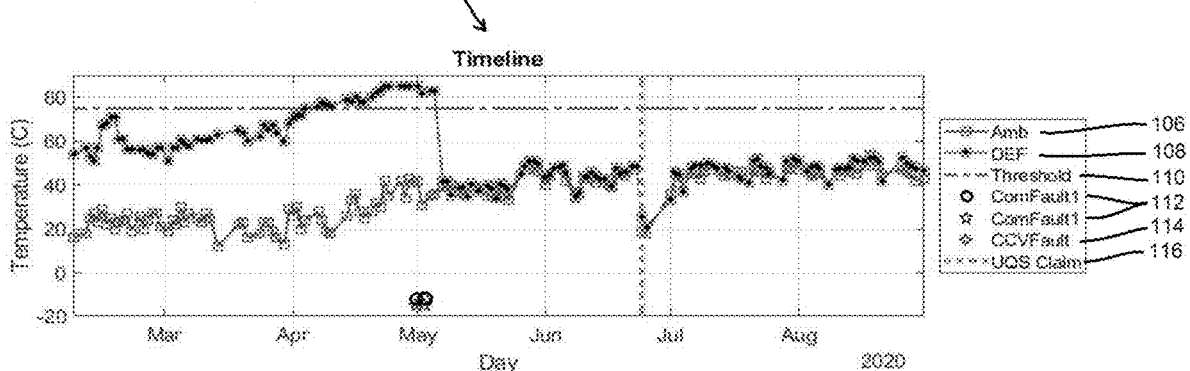
Figure 10A:
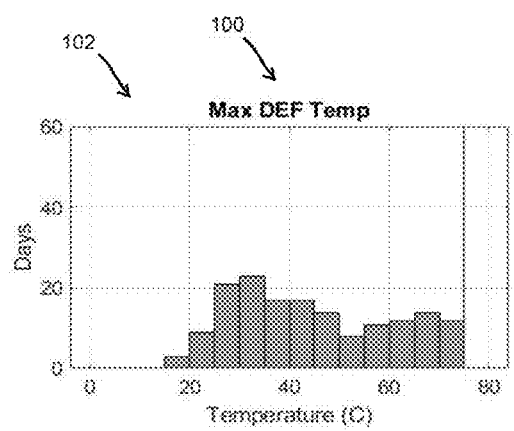
Figure 10B:
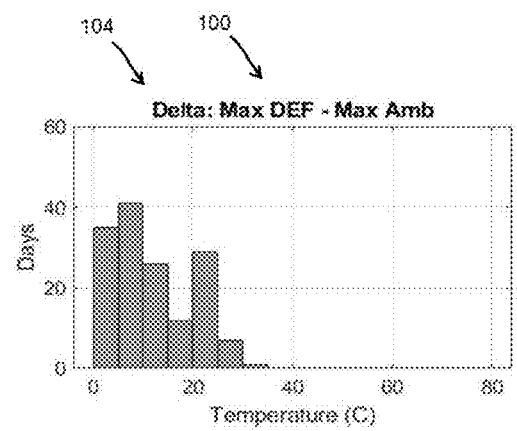
Figure 10C:
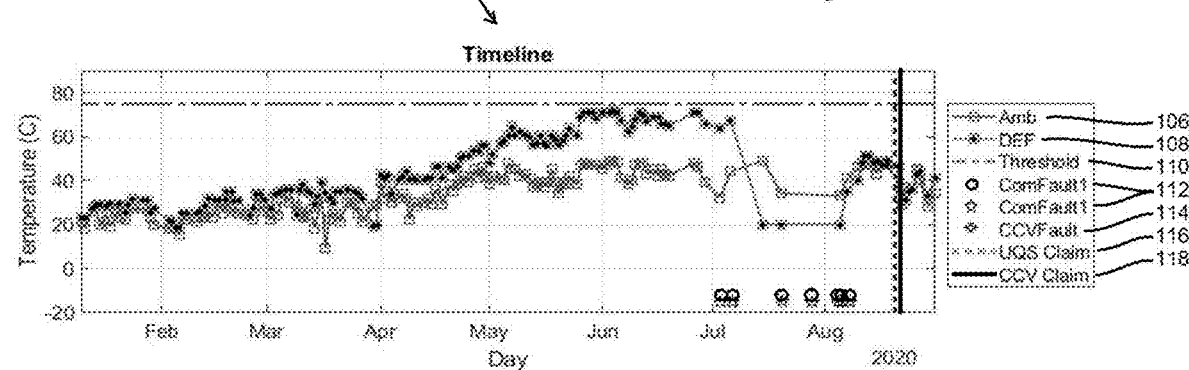
Figure 12A:
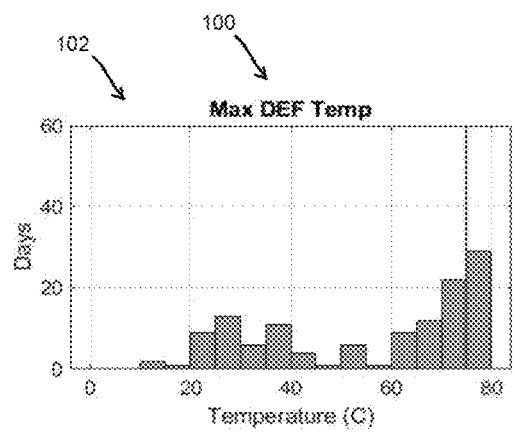
Figure 12B:
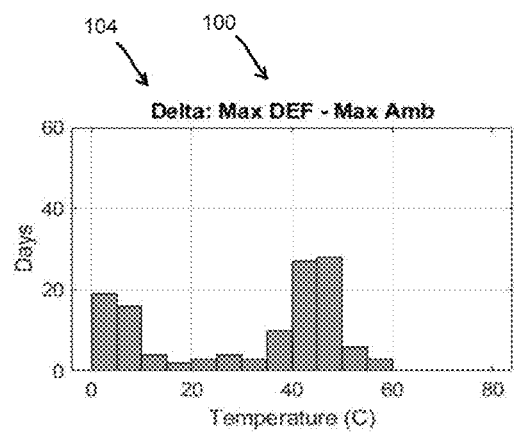
Figure 12C:
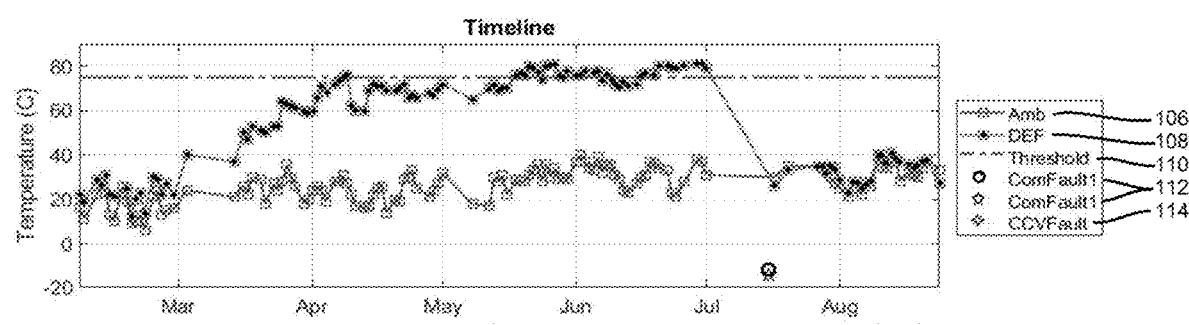
Figure 13A:
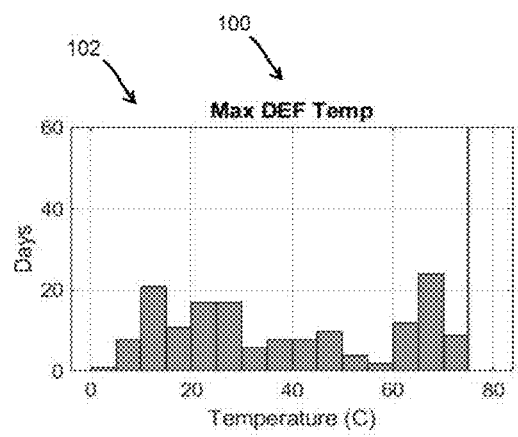
Figure 13B:
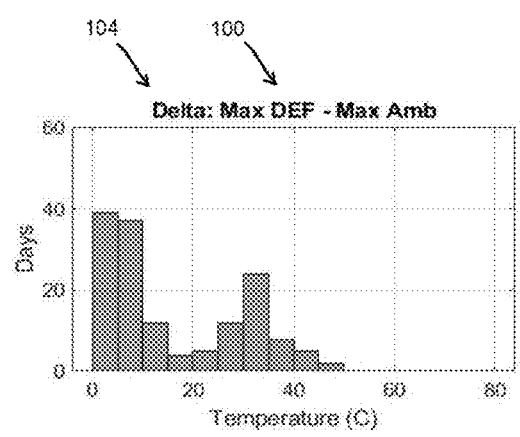
Figure 13C:
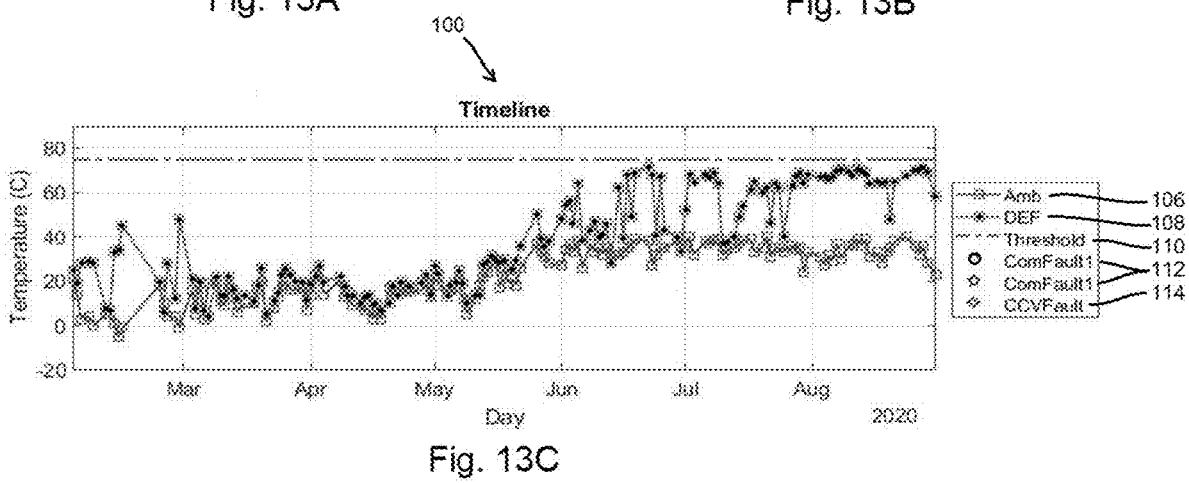
Figure 14A:
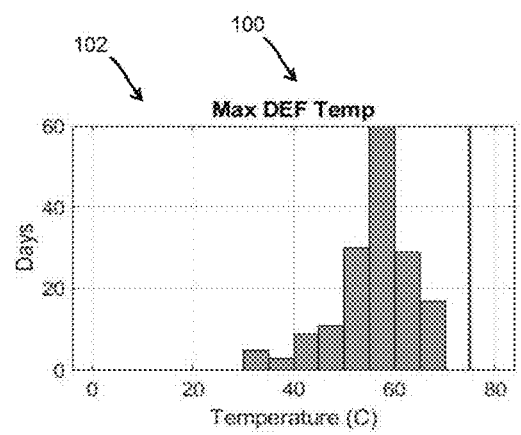
Figure 14B:
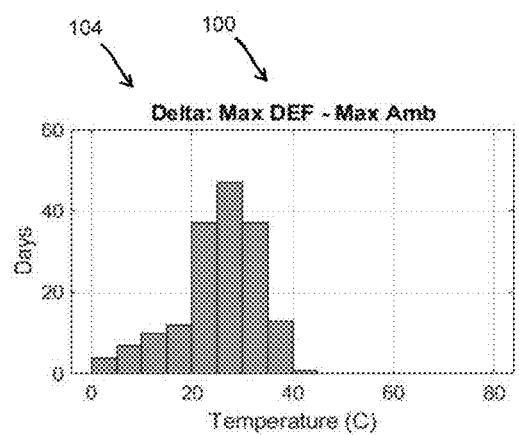
Figure 14C:
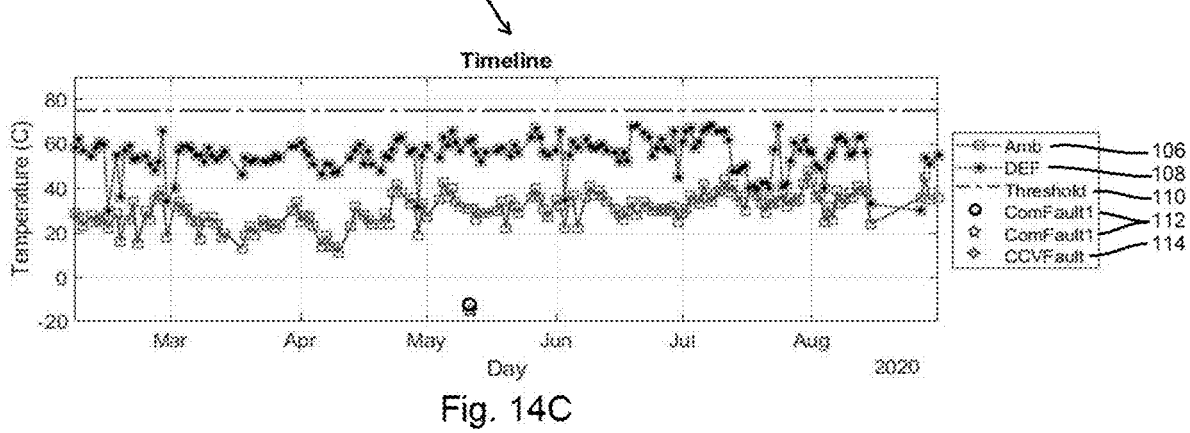
Figure 15A:
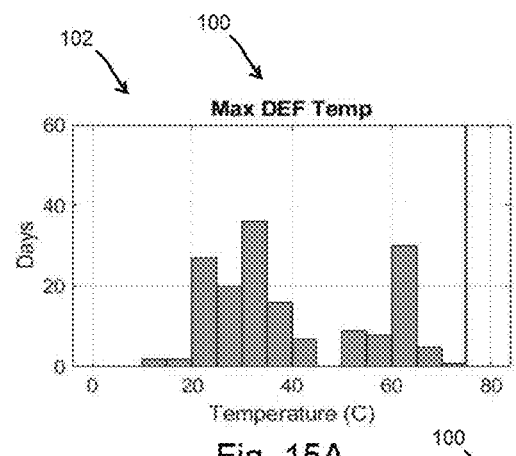
Figure 15B:
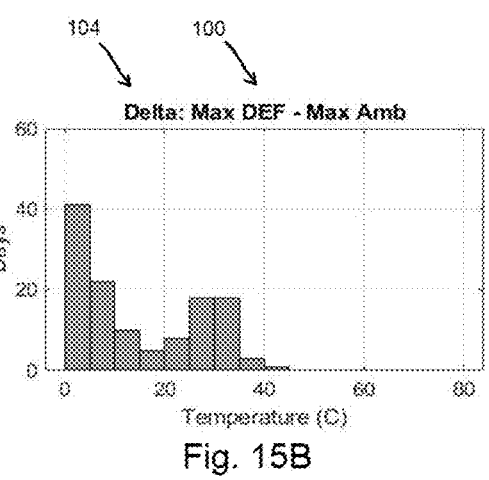
Figure 15C:
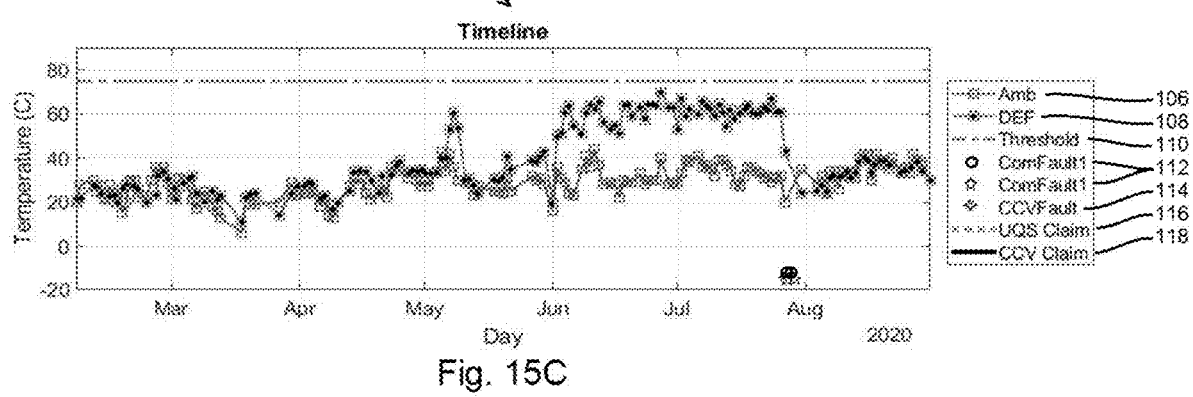
Figure 16A:
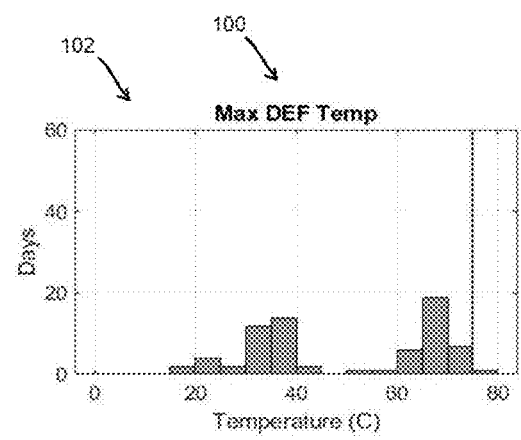
Figure 16B:
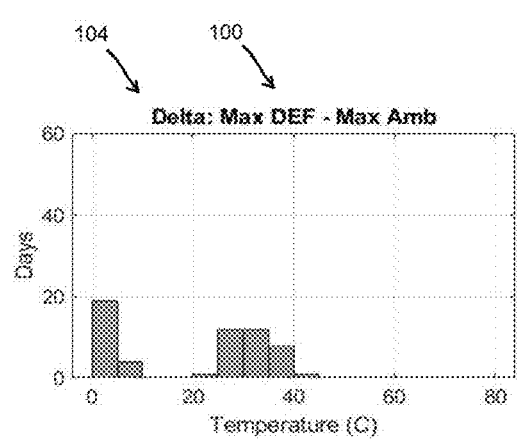
Figure 16C:
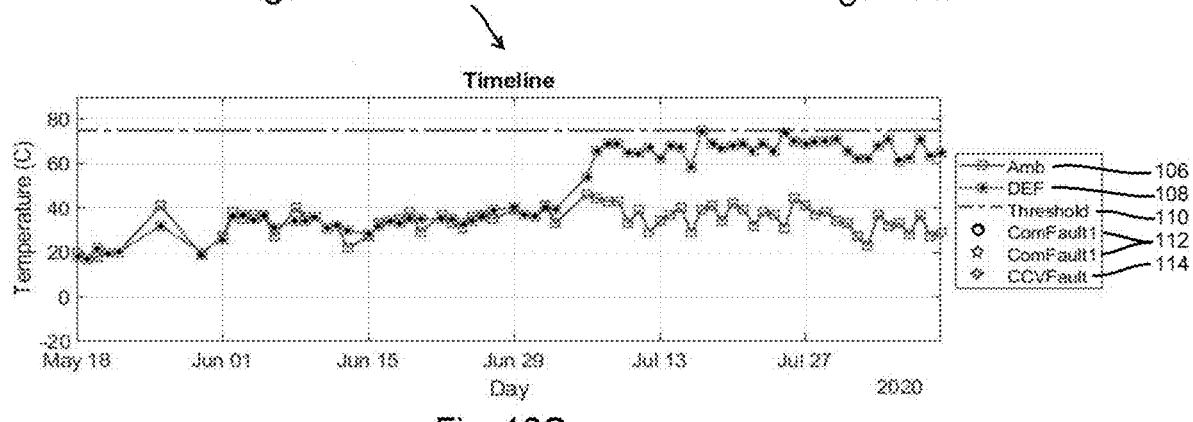
Figure 17A:
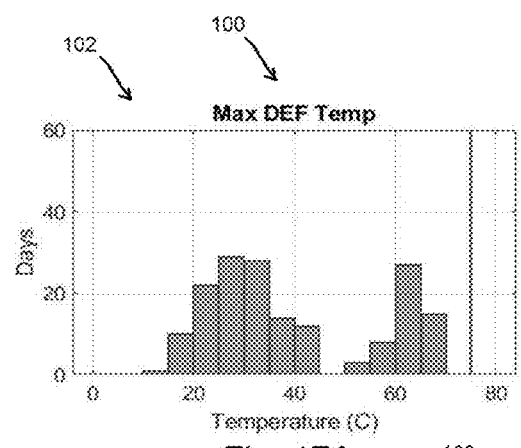
Figure 17B:
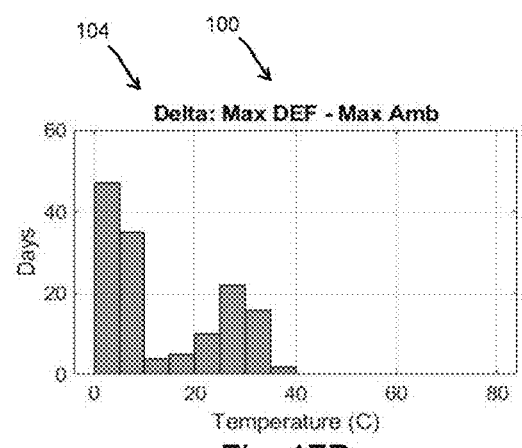
Figure 17C:
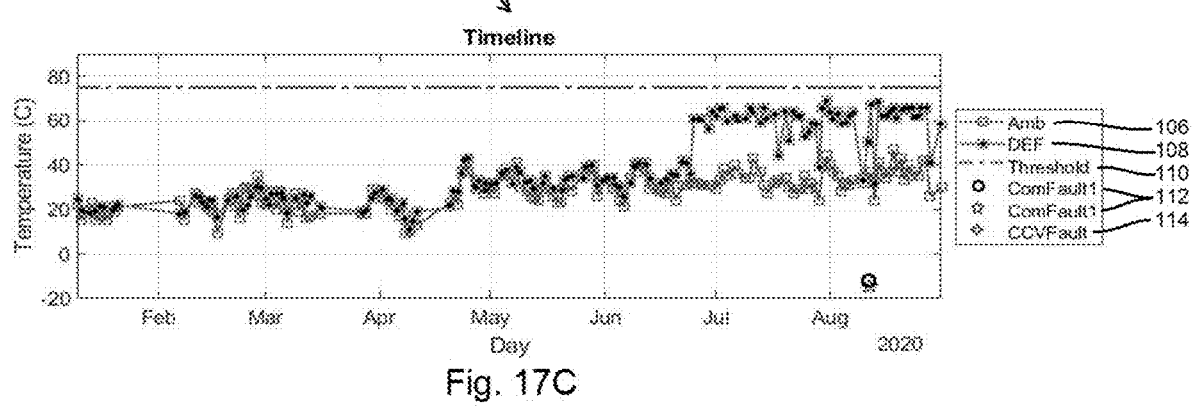
Figure 18A:
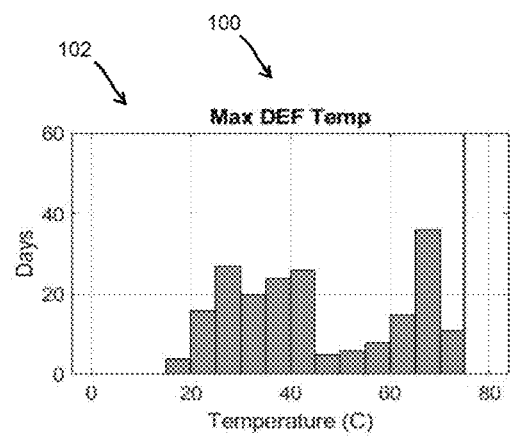
Figure 18B:
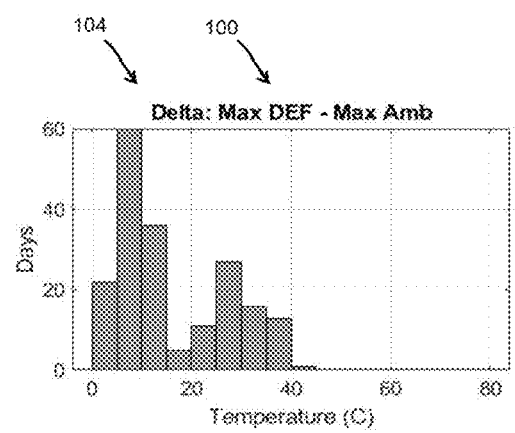
Figure 18C:
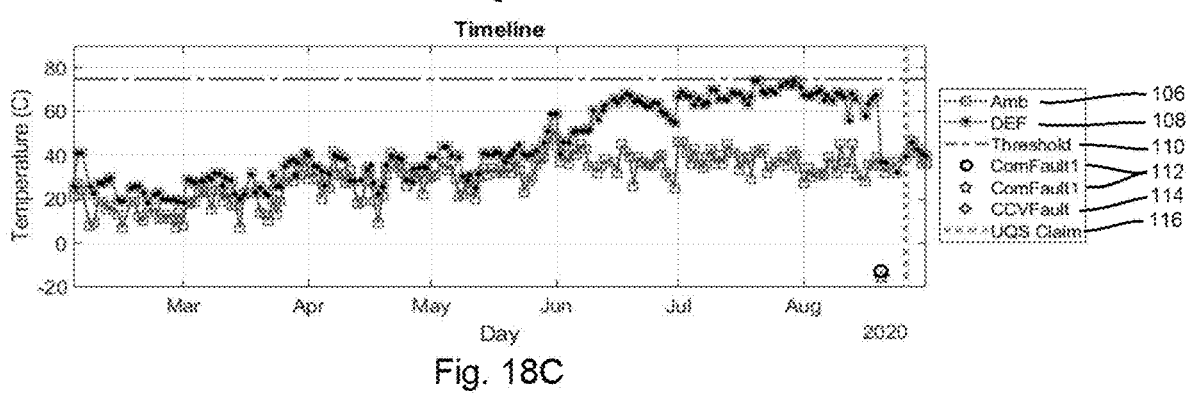
Figures 19A, 19B, 19C:
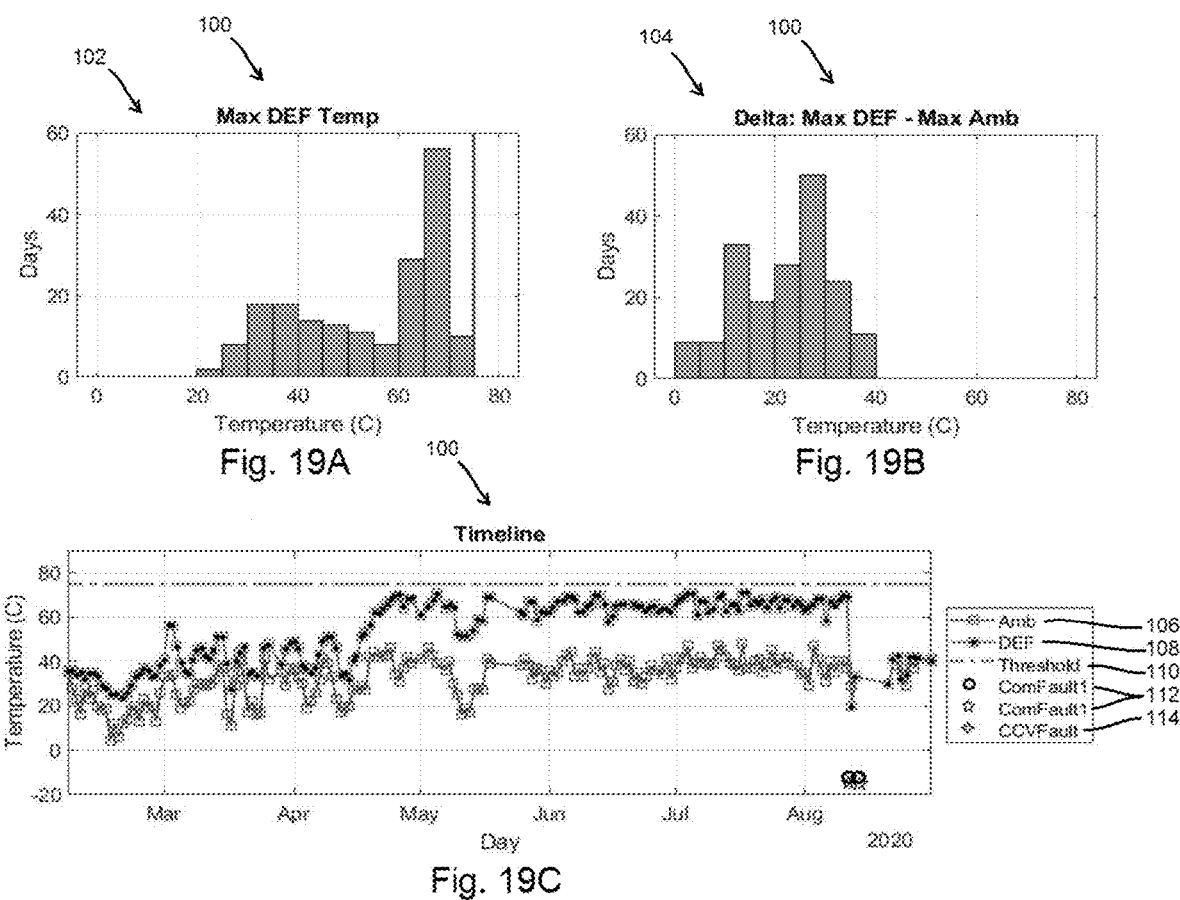
Figure 20A:
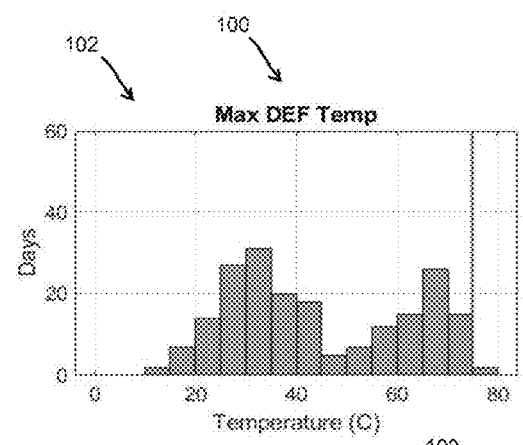
Figure 20B:
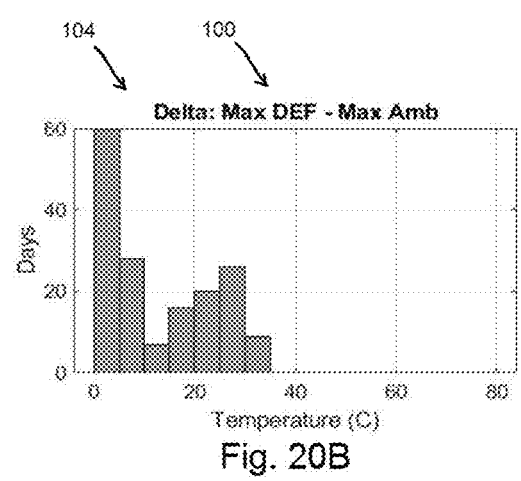
Figure 20C:
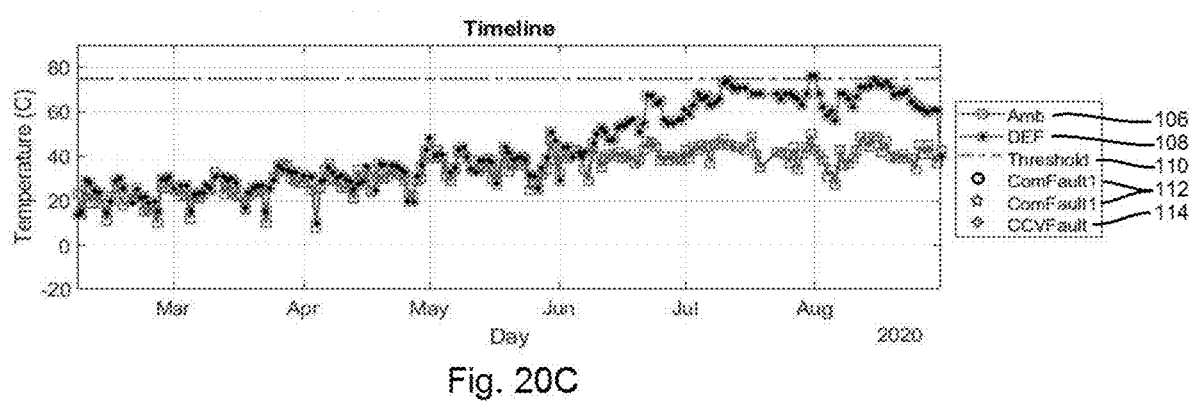
Figure 21A:
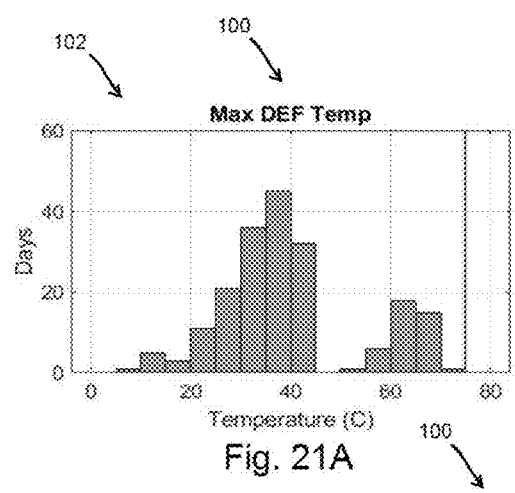
Figure 21B:
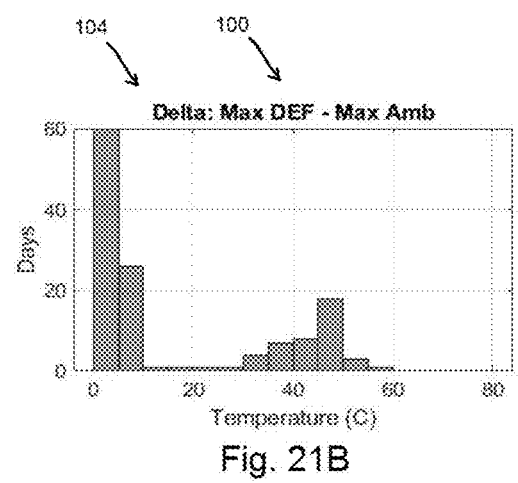
Figure 21C:
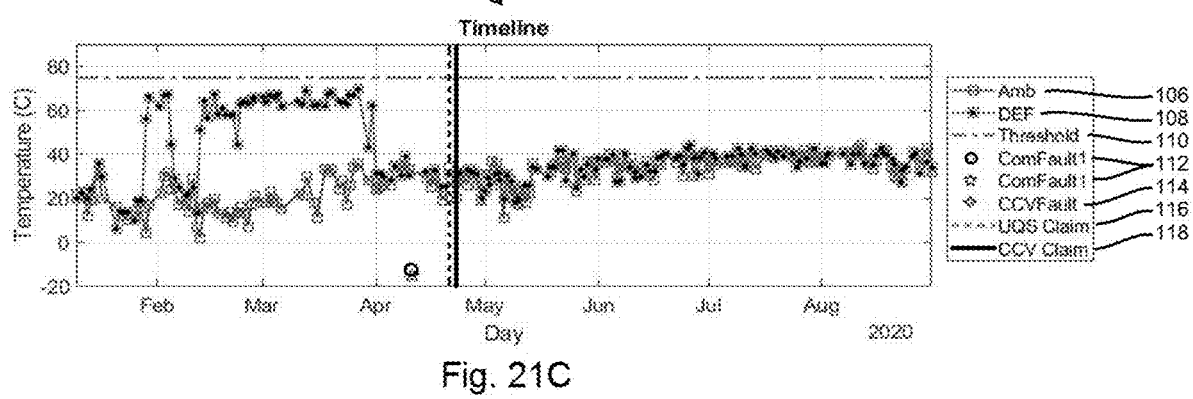
Figure 22A:
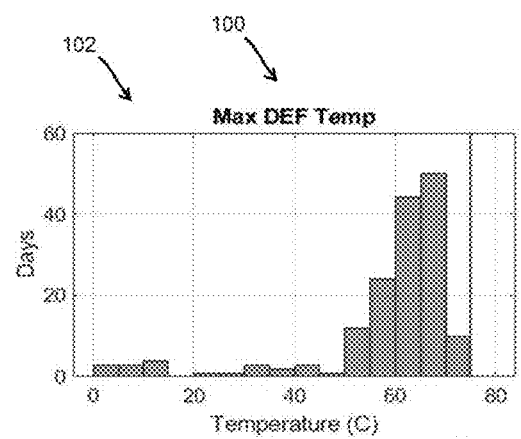
Figure 22B:
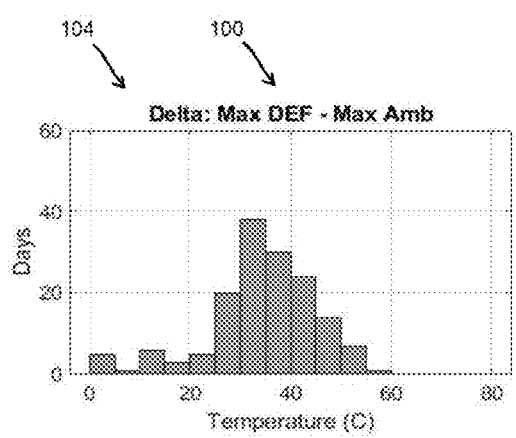
Figure 22C:
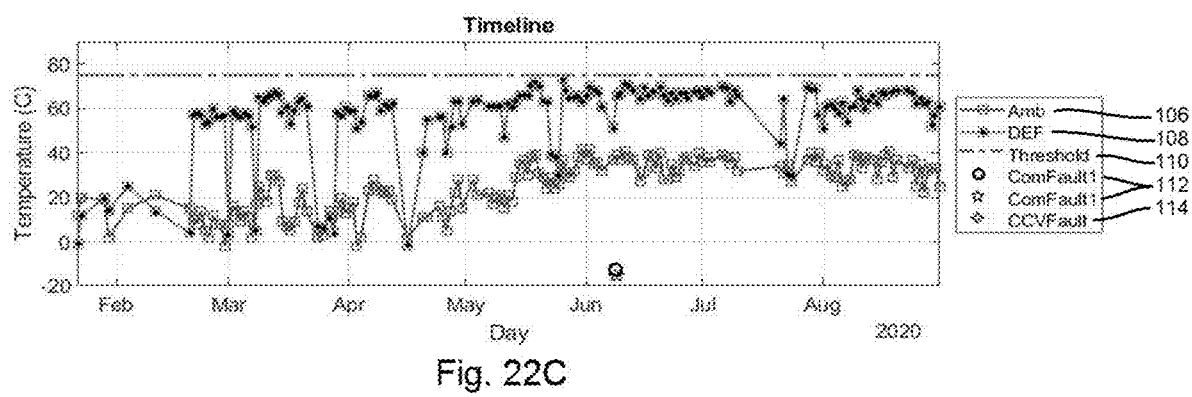
Figure 23A:
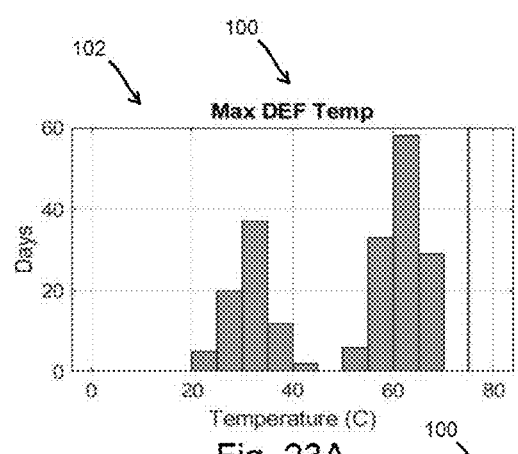
Figure 23B:
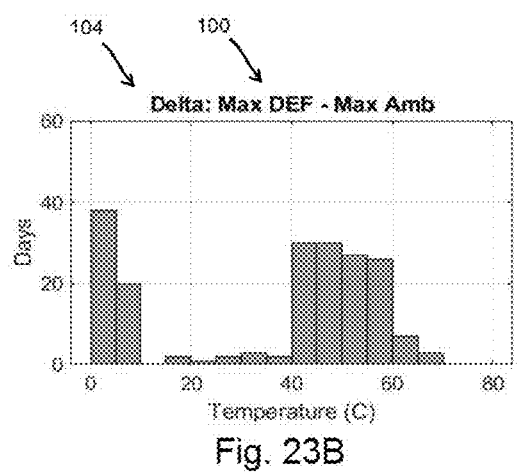
Figure 23C:
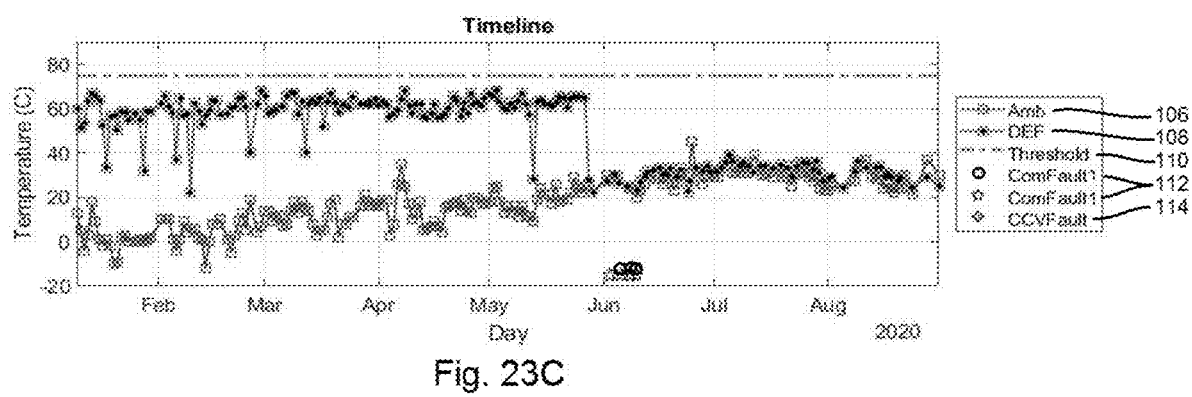
Figure 25A:
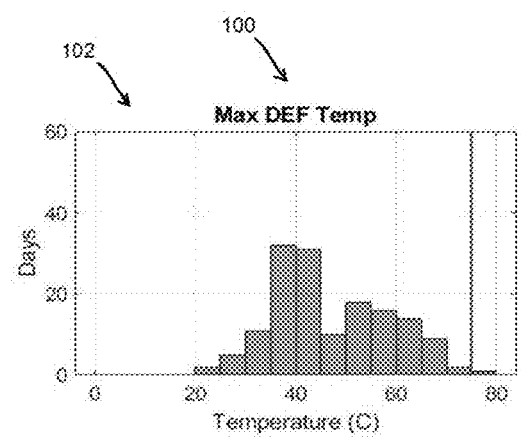
Figure 25B:
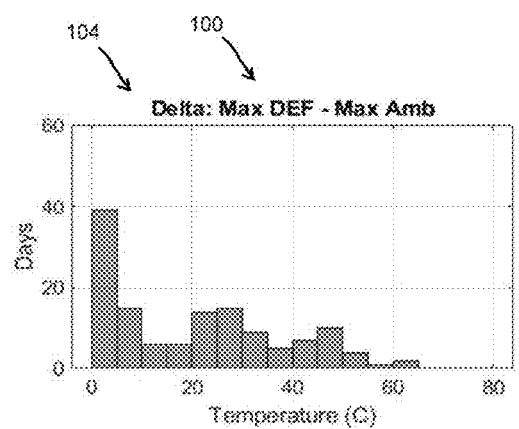
Figure 25C:
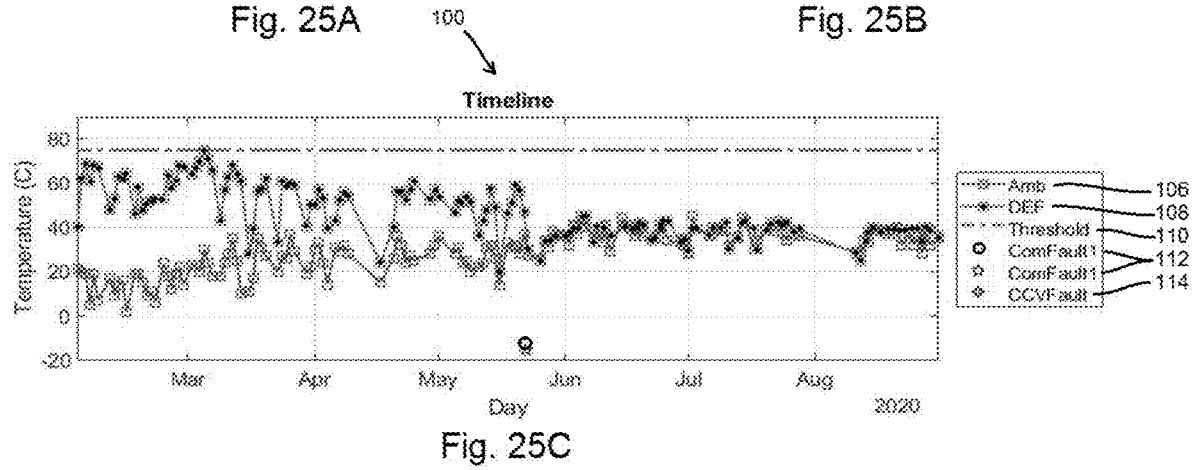
Figure 26A:
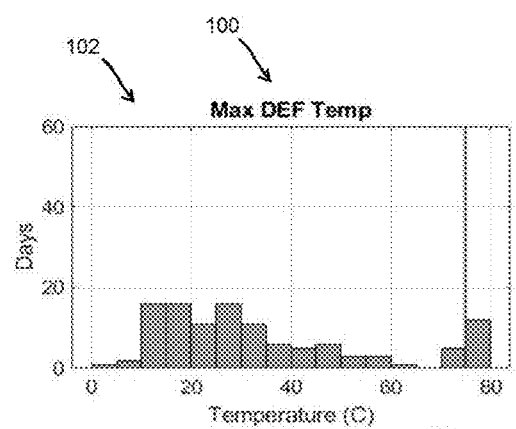
Figure 26B:
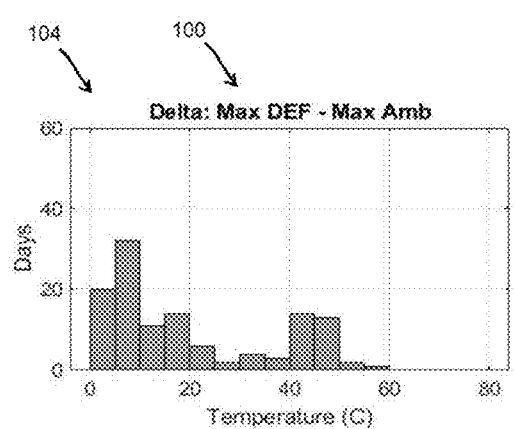
Figure 26C:
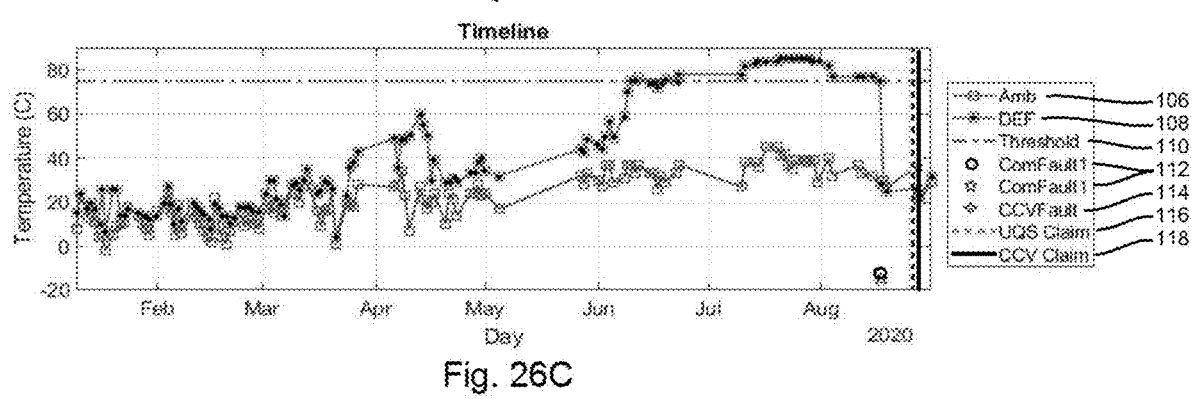
Figure 29A:
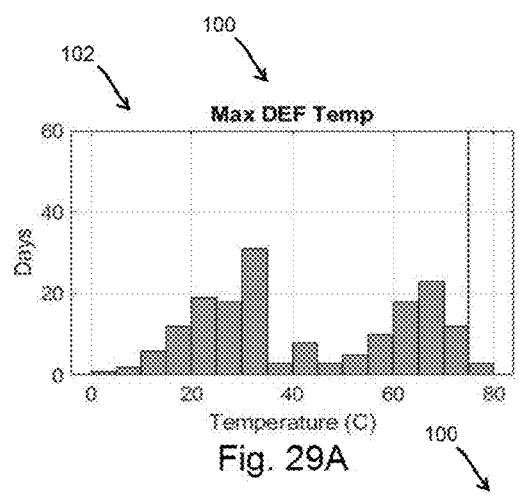
Figure 29B:
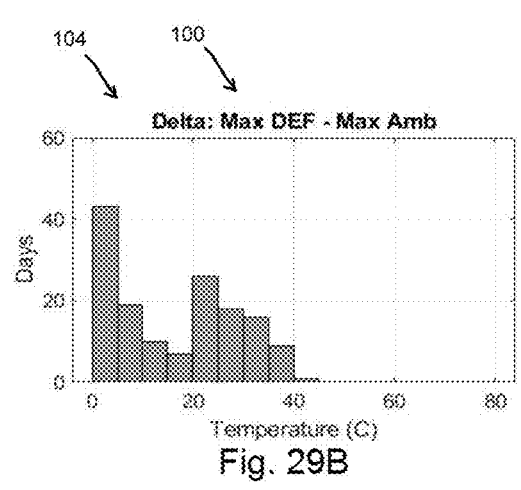
Figure 29C:
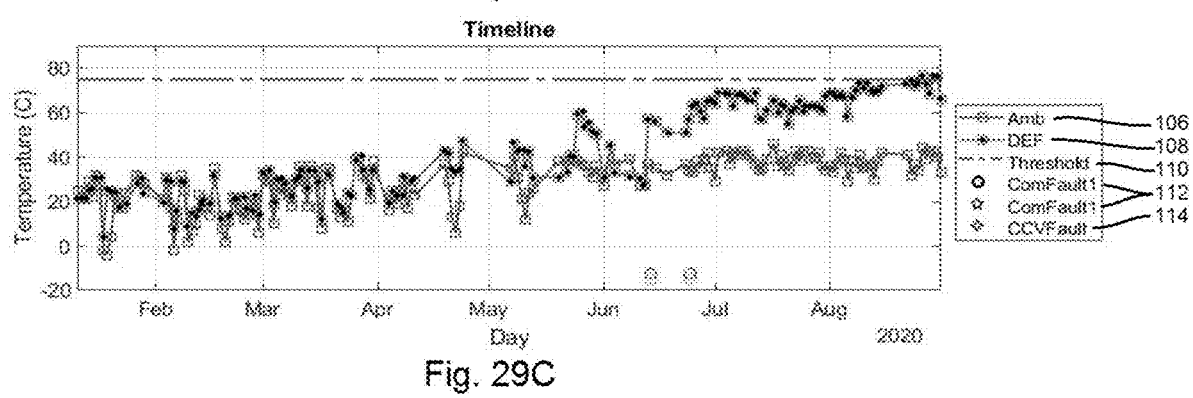
Figure 30A:
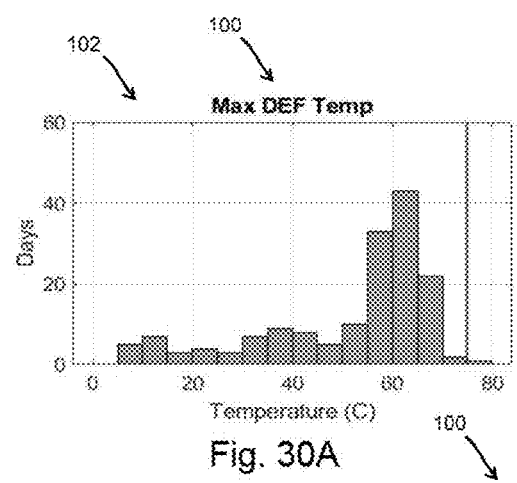
Figure 30B:
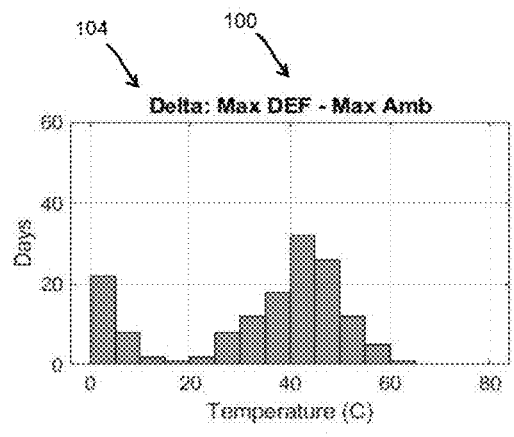
Figure 30C:
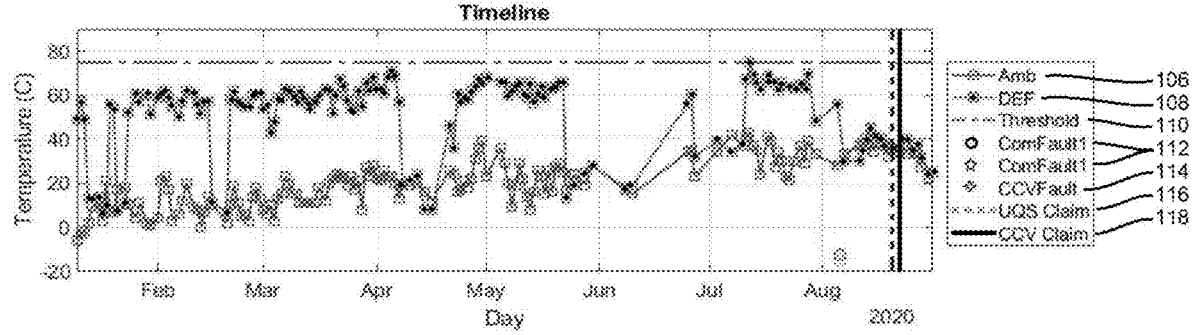
Figures 33A, 33B, 33C:
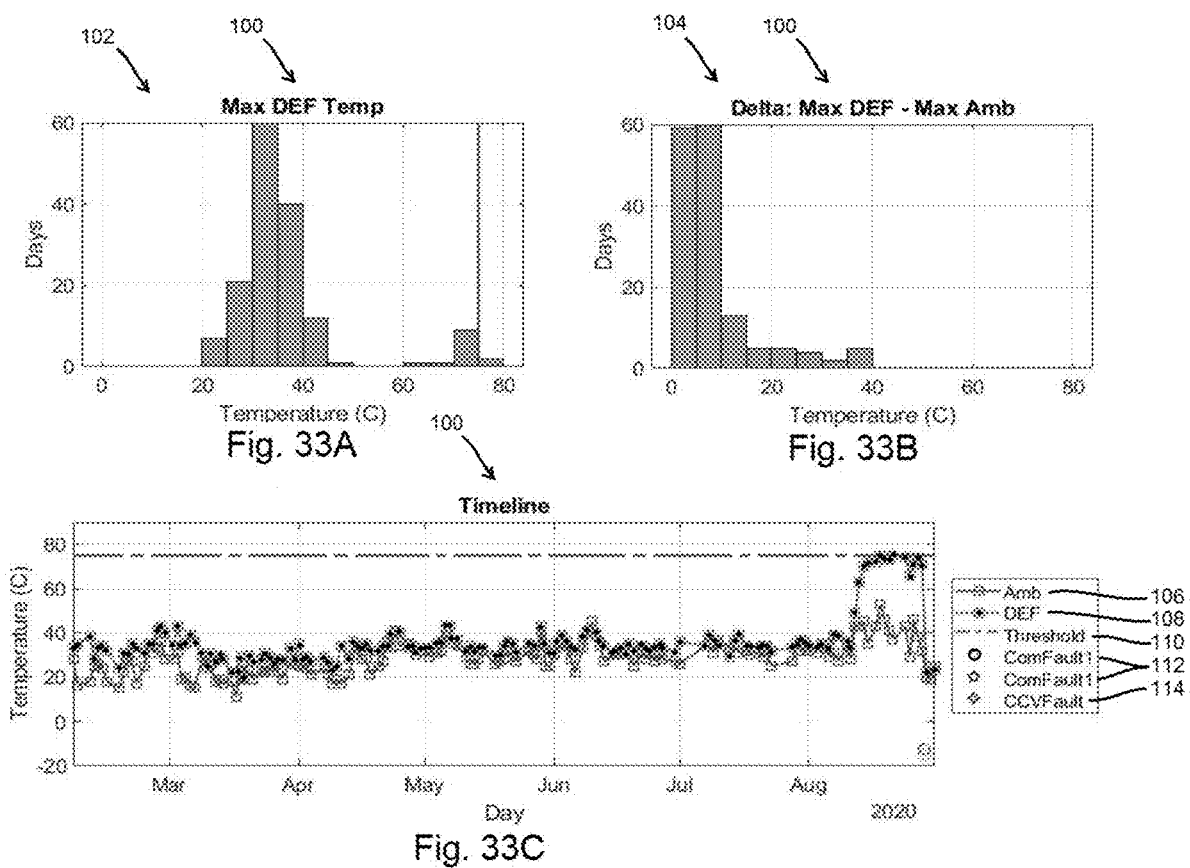
Figure 34A:
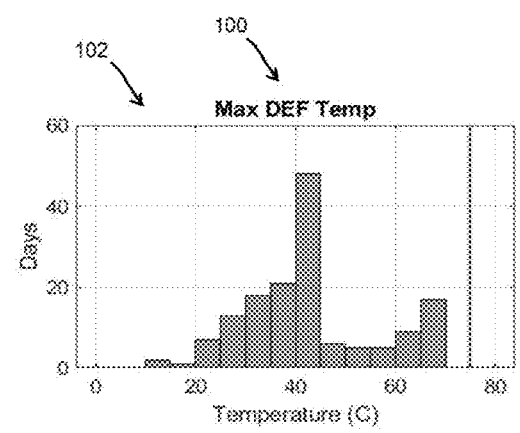
Figure 34B:
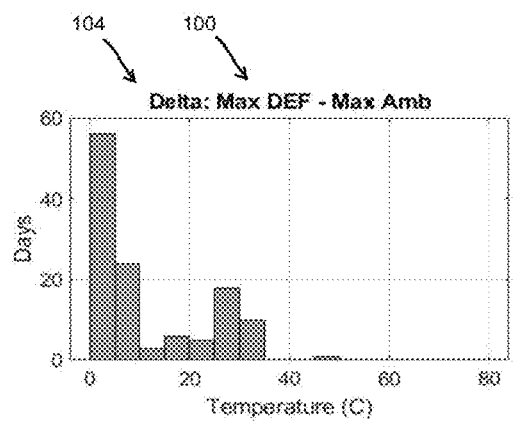
Figure 34C:
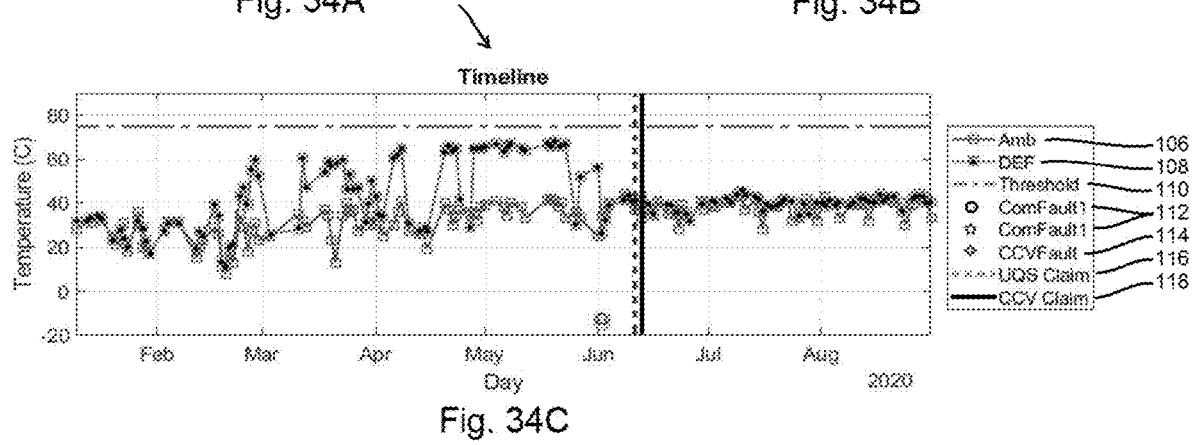
Figure 35A:
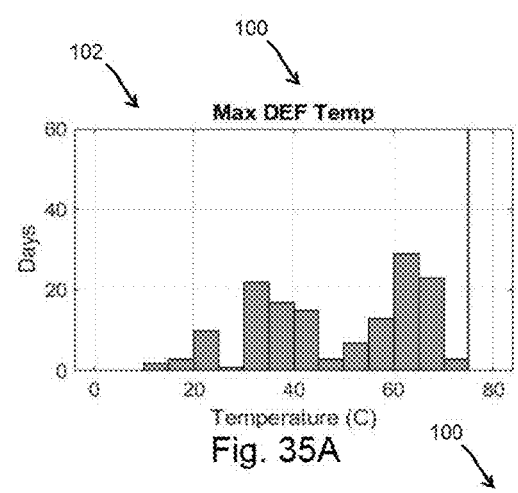
Figure 35B:
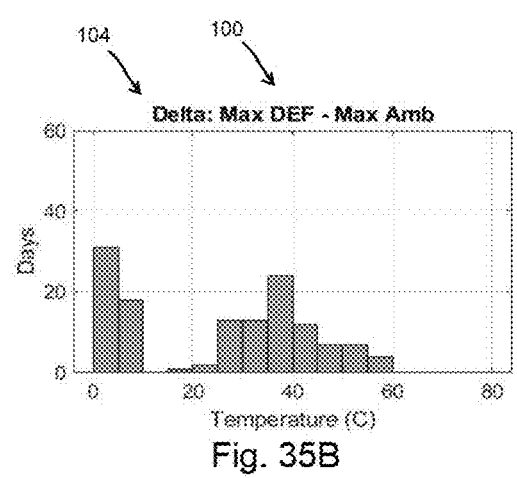
Figure 35C:
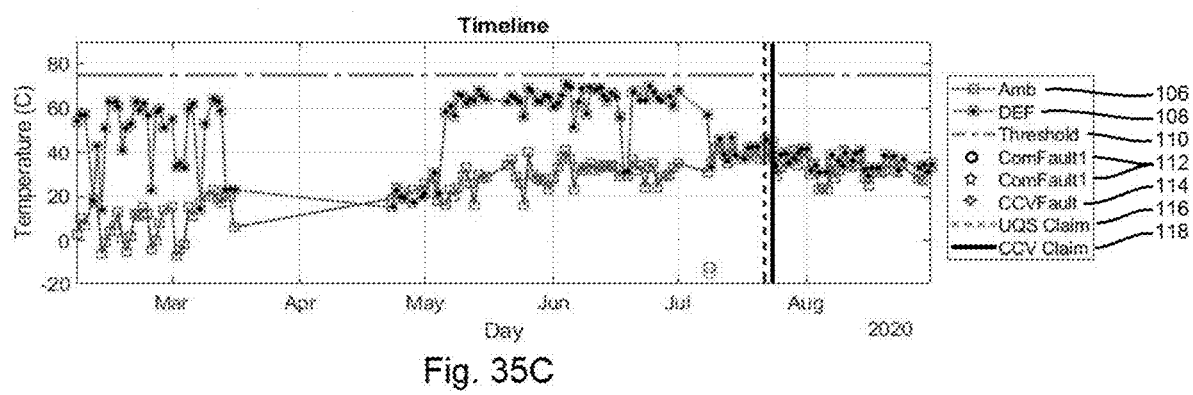
Figure 36A:
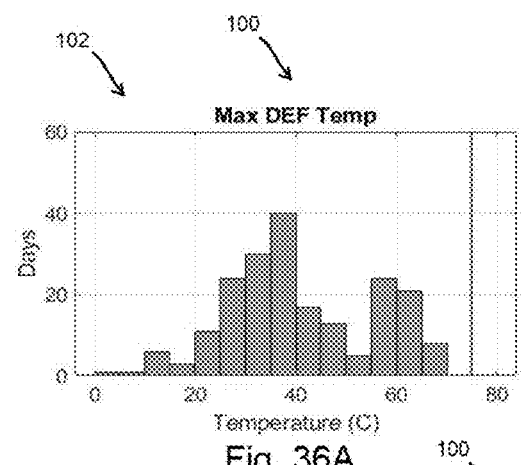
Figure 36B:
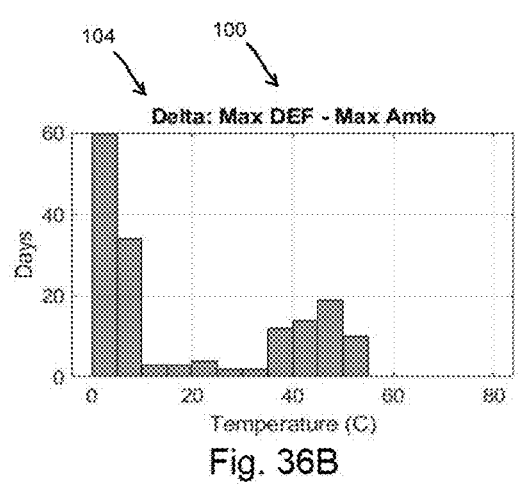
Figure 36C:
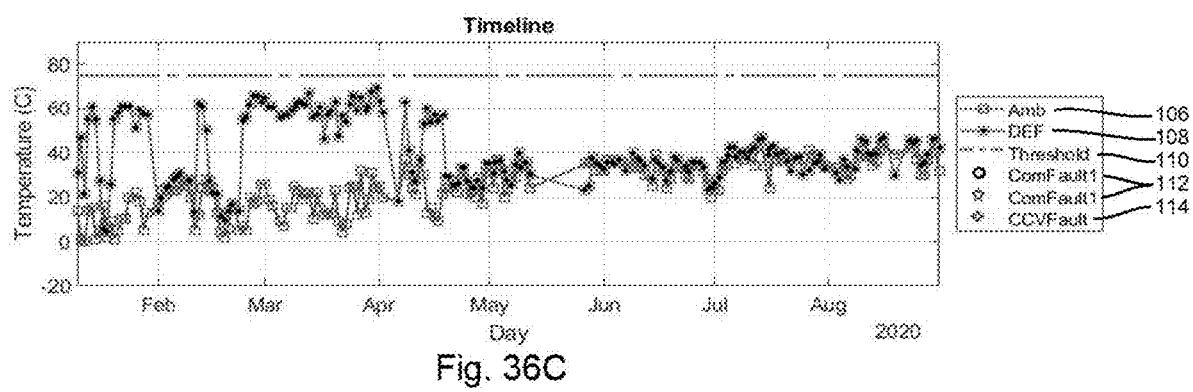
Figures 37A, 37B, 37C:
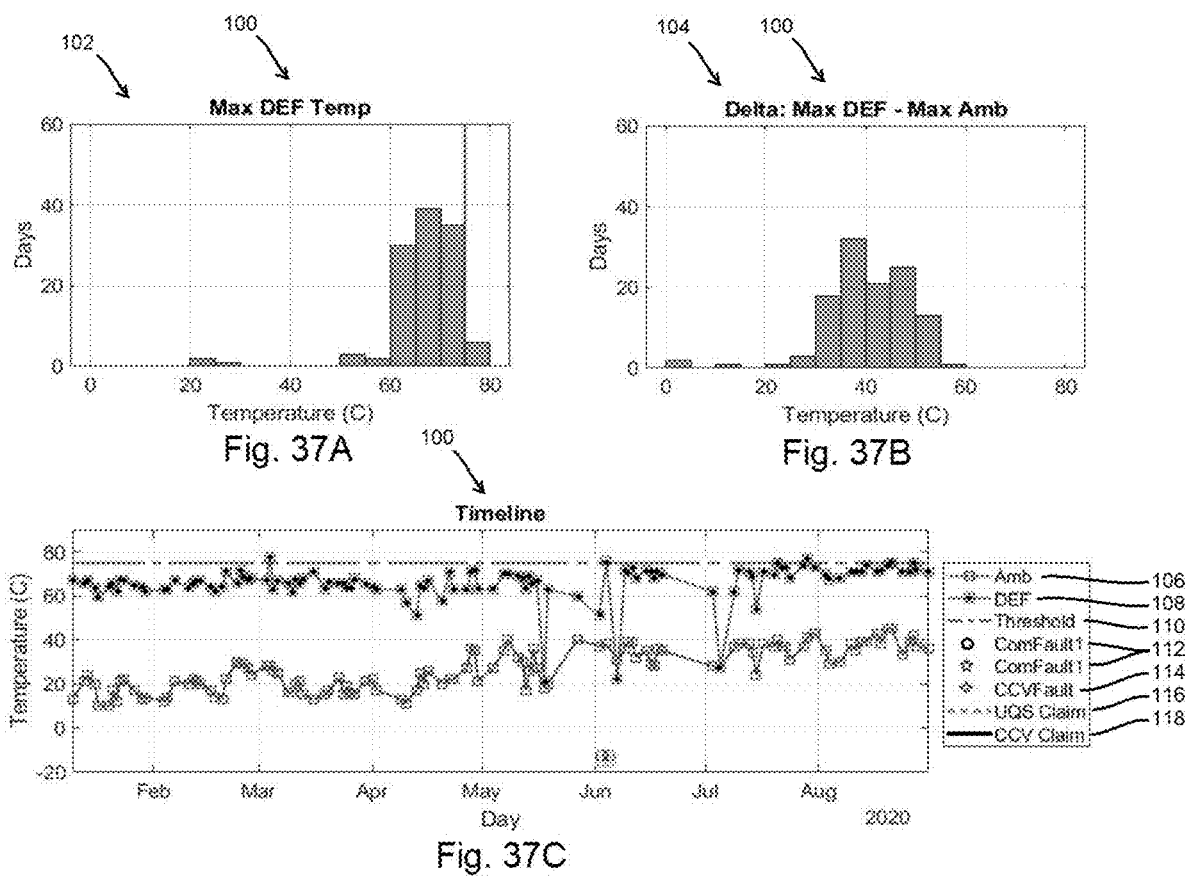
Figure 38A:
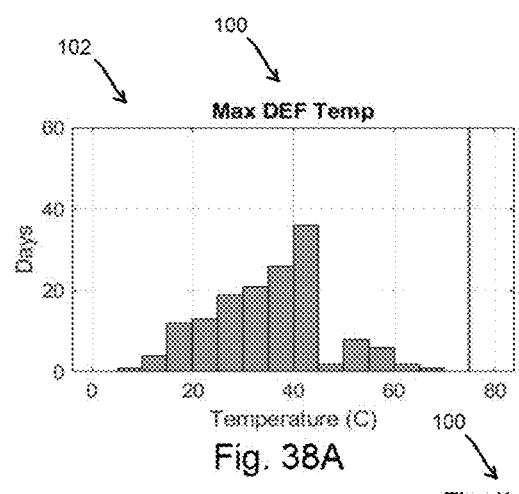
Figure 38B:
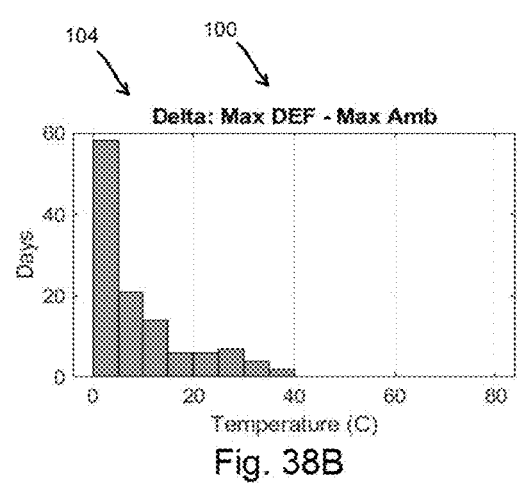
Figure 38C:
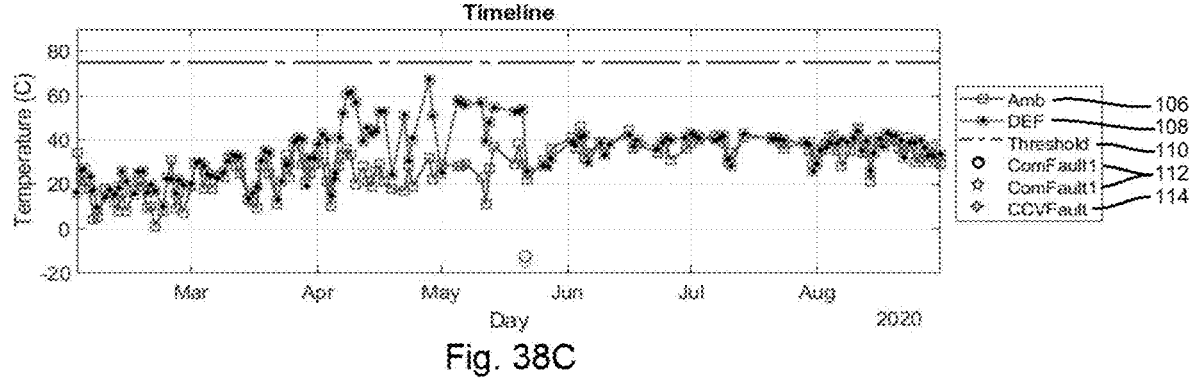

FIG. 2B shows a risk matrix 72 wherein the likelihood of UQS failure is medium to high, and the impact is high. Specifically, in commercial vehicles designed to last 1.2 million miles, the likelihood of a CCV failure is medium to high, while a UQS Communication Fault is an SCR emissions control system tamper fault, i.e.—having the highest impact to the user of the vehicle.

Turning now to FIGS. 3A through 39C, field data 100 is shown. In each of the suffix "A" drawings of FIGS. 3A through 39A, the number of days 102 is indicated on which days a given maximum DEF temperature was achieved. In each of the suffix "B" drawings of FIGS. 3B through 39B, the number of days 104 is indicated on which days a given maximum difference between DEF temperature and ambient temperature was achieved. In each of the suffix "C" drawings of FIGS. 3C through 39C, ambient temperature 106 and DEF temperature 108 in ° C. are shown graphically as a function of time. The CCV fault trigger temperature 110 is shown for reference. The occurrences of com faults 112, CCV faults 114, UQS claim 116, and CCV claim 118 are indicated on the graphs.

The field data shows that DEF tanks with failed or partially failed CCVs often do not reach 75° C. to trigger a fault code based on DEF temperature alone. This eventually results in UQS failure, as indicated by a lack of communication from the sensor. The field data further shows that, when a faulty CCV remains undetected, UQS life is shortened due to accelerated temperature aging. Therefore, shortened UQS life due to accelerated temperature aging is reduced by way of the present apparatus, and control logic therefor, for thawing DEF during cold weather in vehicles having diesel engines and SCR emissions control systems, and methods of use thereof.

While the apparatus, and control logic therefor, for thawing DEF during cold weather in vehicles having diesel engines and SCR emissions control systems, and methods of use thereof, which is configured to protect the UQS in the DEF tank, as well as the DEF itself, from elevated temperatures that may result from a stuck open or stuck partially open CCV under conditions wherein the DEF in the DEF tank does not actually reach a given threshold to trigger a CCV stuck open fault has been described with respect to at least one embodiment, the arrangement and method can be further modified within the spirit and scope of this disclosure, as demonstrated previously. This application is therefore intended to cover any variations, uses, or adaptations of the system and method using its general principles. Further, this application is intended to cover such departures from the present disclosure as come within known or customary practice in the art to which the disclosure pertains and which fall within the limits of the appended claims.

What is claimed is:

1. A vehicle having a Diesel Exhaust Fluid (DEF) Thawing Apparatus, comprising:
    an engine;
    an engine control module (ECM) connected to the engine and configured to control the engine; an exhaust system connected to the engine;
    an SCR catalytic device connected to the exhaust system;
    a Diesel Exhaust Fluid (DEF) injection system connected to the exhaust system upstream of the SCR catalytic device, and further connected to the engine control module;
    a DEF tank connected to the DEF injection system;
    a coolant loop connected to the engine, the coolant loop having at least one Coolant Control Valve (CCV) connected to a control module, and a coolant to DEF heat exchanger;
    a DEF temperature sensor in communication with the DEF tank and connected to the control module to which the CCV is connected;
    an ambient temperature sensor connected to the control module to which the CCV and DEF temperature sensor are connected; the control module to which the CCV, the DEF temperature sensor, and the ambient temperature sensor are connected being configured to trigger a CCV stuck open fault when the DEF tank temperature exceeds the ambient temperature by a first threshold amount for a first period of time; wherein
    at least one of the first period of time and the first threshold amount is a function of at least one of the ambient temperature and the DEF temperature;
    the control module to which the CCV, the DEF temperature sensor, and the ambient temperature sensor are connected being further configured to trigger a CCV stuck open fault when the DEF tank temperature exceeds a second threshold amount for a second period of time;
    and to trigger the CCV stuck open fault if the vehicle is moving above a threshold velocity for a third period of time and the ambient temperature is above a threshold ambient temperature; and
    a Urea Quality Sensor (UQS) arranged in fluid communication with the DEF tank and connected to the control module.

2. The vehicle of claim 1, wherein:
    the control module to which the CCV, the DEF temperature sensor, and the ambient temperature sensor are connected further comprises the engine control module.

3. The vehicle of claim 1, wherein:
    the UQS further comprises an integrated UQS removably attached to the bottom of the DEF tank by way of an internal flange, and having sensor portions located in fluid communication with the DEF within the DEF tank; and
    the UQS having a Printed Circuit Board encapsulated or otherwise sealed into a portion of the integrated UQS that protrudes outside the periphery of the DEF tank.

4. A DEF Thawing Apparatus of a vehicle having an engine, an ECM connected to the engine
    and configured to control the engine, and an exhaust system connected to the engine and having an SCR catalytic device, comprising:
    a DEF injection system connected to the exhaust system upstream of the SCR catalytic device, and further connected to the ECM;
    a DEF tank connected to the DEF injection system;
    a coolant loop connected to the engine, the coolant loop having at least one Coolant Control Valve (CCV) connected to a control module, and a coolant to DEF heat exchanger;
    a DEF temperature sensor in communication with the DEF tank and connected to the control module to which the CCV is connected;
    an ambient temperature sensor connected to the control module to which the CCV and DEF temperature sensor are connected;
    the control module to which the CCV, the DEF temperature sensor, and the ambient temperature sensor are connected being configured to trigger a CCV stuck open fault when the DEF tank temperature exceeds the ambient temperature by a first threshold amount for a first period of time; wherein
    at least one of the first period of time and the first threshold amount is a function of at least one of the ambient temperature and the DEF temperature;
    the control module to which the CCV, the DEF temperature sensor, and the ambient temperature sensor are connected being further configured to trigger a CCV stuck open fault when the DEF tank temperature exceeds a second threshold amount for a second period of time;
    configured and to trigger the CCV stuck open fault if the vehicle is moving above a threshold velocity for a third period of time and the ambient temperature is above a threshold ambient temperature; and a Urea Quality Sensor (UQS) arranged in fluid communication with the DEF tank and connected to the control module.

5. The DEF Thawing Apparatus of claim 4, wherein:

the control module to which the CCV, the DEF temperature sensor, and the ambient temperature sensor are connected further comprises the engine control module.

6. The DEF Thawing Apparatus of claim 4, wherein:

the UQS further comprises an integrated UQS removably attached to the bottom of the DEF tank by way of an internal flange, and having sensor portions located in fluid communication with the DEF within the DEF tank; and the UQS having a Printed Circuit Board encapsulated or otherwise sealed into a portion of the integrated UQS that protrudes outside the periphery of the DEF tank.

7. A method of thawing DEF in a vehicle having an engine, an ECM connected to the engine and configured to control the engine, an exhaust system connected to the engine and having an SCR catalytic device, and a DEF injection system connected to the exhaust system and having a DEF tank, comprising the steps of:

connecting a coolant loop to the engine, the coolant loop having at least one Coolant Control Valve (CCV) connected to a control module, and a coolant to DEF heat exchanger;

placing a DEF temperature sensor in communication with the DEF tank and connecting it to the control module to which the CCV is connected;

connecting an ambient temperature sensor to the control module to which the CCV and DEF temperature sensor are connected;

configuring the control module to which the CCV, the DEF temperature sensor, and the ambient temperature sensor are connected to trigger a CCV stuck open fault when the DEF tank temperature exceeds the ambient temperature by a first threshold amount for a first period of time; wherein at least one of the first period of time and the first threshold amount being a function of at least one of the ambient temperature and the DEF temperature;

further configuring the control module to which the CCV, the DEF temperature sensor, and the ambient temperature sensor are connected to trigger a CCV stuck open fault when the DEF tank temperature exceeds a second threshold amount for a second period of time;

and to trigger the CCV stuck open fault if the vehicle is moving above a threshold velocity for a third period of time and the ambient temperature is above a threshold ambient temperature; and arranging a Urea Quality Sensor (UQS) in fluid communication with the DEF tank and connecting it to the control module.

8. The method of claim 7, wherein:

the control module to which the CCV, the DEF temperature sensor, and the ambient temperature sensor are connected further comprises the engine control module.

* * * * *